United States Patent
Long et al.

(10) Patent No.: US 9,400,051 B2
(45) Date of Patent: Jul. 26, 2016

(54) COLD OPERATION MODE CONTROL FOR AN IVT

(71) Applicant: Allison Transmisson, Inc., Indianapolis, IN (US)

(72) Inventors: Charles F. Long, Pittsboro, IN (US); Darren J. Weber, Indianapolis, IN (US); John William Edward Fuller, Preston (GB); Stephen Murray, Grimsargh (GB)

(73) Assignee: Allison Transmisson, Inc., Indianapolis, IN (US)

( * ) Notice: Subject to any disclaimer, the term of this patent is extended or adjusted under 35 U.S.C. 154(b) by 133 days.

(21) Appl. No.: 13/828,135

(22) Filed: Mar. 14, 2013

(65) Prior Publication Data

US 2013/0338889 A1    Dec. 19, 2013

Related U.S. Application Data

(60) Provisional application No. 61/660,666, filed on Jun. 15, 2012.

(51) Int. Cl.
| | |
|---|---|
| *F16H 61/12* | (2010.01) |
| *F16H 61/664* | (2006.01) |
| *F16D 48/06* | (2006.01) |
| *F16H 61/02* | (2006.01) |

(52) U.S. Cl.
CPC ............ *F16H 61/12* (2013.01); *F16D 48/062* (2013.01); *F16D 48/066* (2013.01); *F16H 61/0206* (2013.01); *F16H 61/664* (2013.01); *F16H 61/6648* (2013.01); *F16H 61/6649* (2013.01); *F16H 2061/1224* (2013.01); *F16H 2061/1264* (2013.01)

(58) Field of Classification Search
CPC ............... F16H 61/12; F16H 61/6648; F16H 2061/1264; F16H 2061/1224; F16H 13/08; F16H 13/04
USPC ............................................................ 701/58
See application file for complete search history.

(56) References Cited

U.S. PATENT DOCUMENTS

| | | | |
|---|---|---|---|
| 2,347,873 | A | 5/1944 | Bloomfield |
| 2,410,818 | A | 11/1946 | Grant |
| 2,554,221 | A | 5/1951 | Stephenson et al. |
| 2,583,843 | A | 1/1952 | Herrick |

(Continued)

FOREIGN PATENT DOCUMENTS

| | | |
|---|---|---|
| EP | 1519084 A2 | 9/2004 |
| WO | 9849455 A2 | 11/1998 |
| WO | 2010048029 A2 | 4/2010 |

OTHER PUBLICATIONS

International Search Report and Written Opinion received for PCT International Application No. PCT/US2013/045580, completed Oct. 27, 2013, 3 pages.

(Continued)

*Primary Examiner* — Todd Melton
(74) *Attorney, Agent, or Firm* — Barnes & Thornburg LLP

(57) ABSTRACT

A transmission includes an electro-hydraulic controller that includes redundancy in the hydraulic circuit that permits single fault failures to be compensated for by changing the flow path of hydraulic fluid to bypass the single fault failure. The redundancy results in the ability of the transmission to maintain full operation in all modes.

18 Claims, 23 Drawing Sheets

(56) References Cited

U.S. PATENT DOCUMENTS

| | | |
|---|---|---|
| 2,596,654 A | 5/1952 | Clark et al. |
| 2,718,292 A | 9/1955 | Meilander et al. |
| 2,841,330 A | 7/1958 | Brewer et al. |
| 3,324,744 A | 6/1967 | Roper |
| 3,432,016 A | 3/1969 | Vogt |
| 3,481,436 A | 12/1969 | Wilkowski |
| 3,631,741 A | 1/1972 | Kelbel |
| 4,107,776 A | 8/1978 | Beale |
| 4,114,478 A | 9/1978 | Clauss |
| 4,361,217 A | 11/1982 | Bieber et al. |
| 4,381,828 A | 5/1983 | Lunn et al. |
| 4,813,524 A | 3/1989 | Reik |
| 5,062,050 A | 10/1991 | Petzold et al. |
| 5,152,726 A | 10/1992 | Lederman |
| 5,355,981 A | 10/1994 | Itoh et al. |
| 5,407,024 A | 4/1995 | Watson et al. |
| 5,441,130 A | 8/1995 | Ha |
| 5,538,121 A | 7/1996 | Hering |
| 5,584,776 A | 12/1996 | Weilant et al. |
| 5,653,322 A | 8/1997 | Vasa et al. |
| 5,662,198 A | 9/1997 | Kojima et al. |
| 5,704,867 A | 1/1998 | Bowen |
| 5,771,477 A | 6/1998 | Showalter et al. |
| 5,833,566 A | 11/1998 | Showalter |
| 5,884,526 A | 3/1999 | Fogelberg |
| 5,893,812 A | 4/1999 | Narai et al. |
| 5,918,715 A | 7/1999 | Ruth et al. |
| 5,992,592 A | 11/1999 | Showalter |
| 6,062,361 A | 5/2000 | Showalter |
| 6,149,540 A | 11/2000 | Johnson et al. |
| 6,149,543 A | 11/2000 | Breen |
| 6,155,395 A | 12/2000 | Braford |
| 6,251,045 B1 | 6/2001 | Oliveira et al. |
| 6,460,671 B1 | 10/2002 | Karambelas et al. |
| 6,588,559 B2 | 7/2003 | Blair |
| 6,672,442 B2 | 1/2004 | Kato et al. |
| 6,679,367 B2 | 1/2004 | Baker et al. |
| 6,790,153 B2 | 9/2004 | Goto |
| 6,834,750 B2 | 12/2004 | Baker et al. |
| 6,846,257 B2 | 1/2005 | Baker et al. |
| 7,052,430 B2 | 5/2006 | Stevenson et al. |
| 7,189,182 B2 | 3/2007 | Stevenson et al. |
| 7,204,337 B2 | 4/2007 | Wildfellner |
| 7,219,569 B2 | 5/2007 | Jastrzembowski et al. |
| 7,278,951 B2 * | 10/2007 | Fuller .............................. 476/9 |
| 7,300,375 B2 * | 11/2007 | Petrzik ........................ 475/119 |
| 7,322,899 B1 | 1/2008 | Long et al. |
| 8,152,673 B2 | 4/2012 | Yanay |
| 8,298,112 B2 | 10/2012 | Takada |
| 8,821,340 B2 * | 9/2014 | Schoolcraft ....................... 476/9 |
| 2002/0005325 A1 | 1/2002 | Yamada |
| 2003/0051959 A1 | 3/2003 | Blair |
| 2003/0226415 A1 | 12/2003 | Baker et al. |
| 2004/0104096 A1 | 6/2004 | Genise |
| 2006/0189435 A1 | 8/2006 | Flaig et al. |
| 2009/0082150 A1 | 3/2009 | Wu et al. |
| 2009/0118912 A1 | 5/2009 | Hugenroth et al. |
| 2011/0144872 A1 | 6/2011 | Long et al. |
| 2012/0072084 A1 | 3/2012 | Stoller et al. |
| 2013/0338888 A1 | 12/2013 | Long et al. |
| 2013/0338891 A1 | 12/2013 | Long et al. |
| 2013/0338893 A1 | 12/2013 | Long et al. |

OTHER PUBLICATIONS

U.S. Appl. No. 61/660,666, dated Dec. 16, 2009, (31 pages).

* cited by examiner

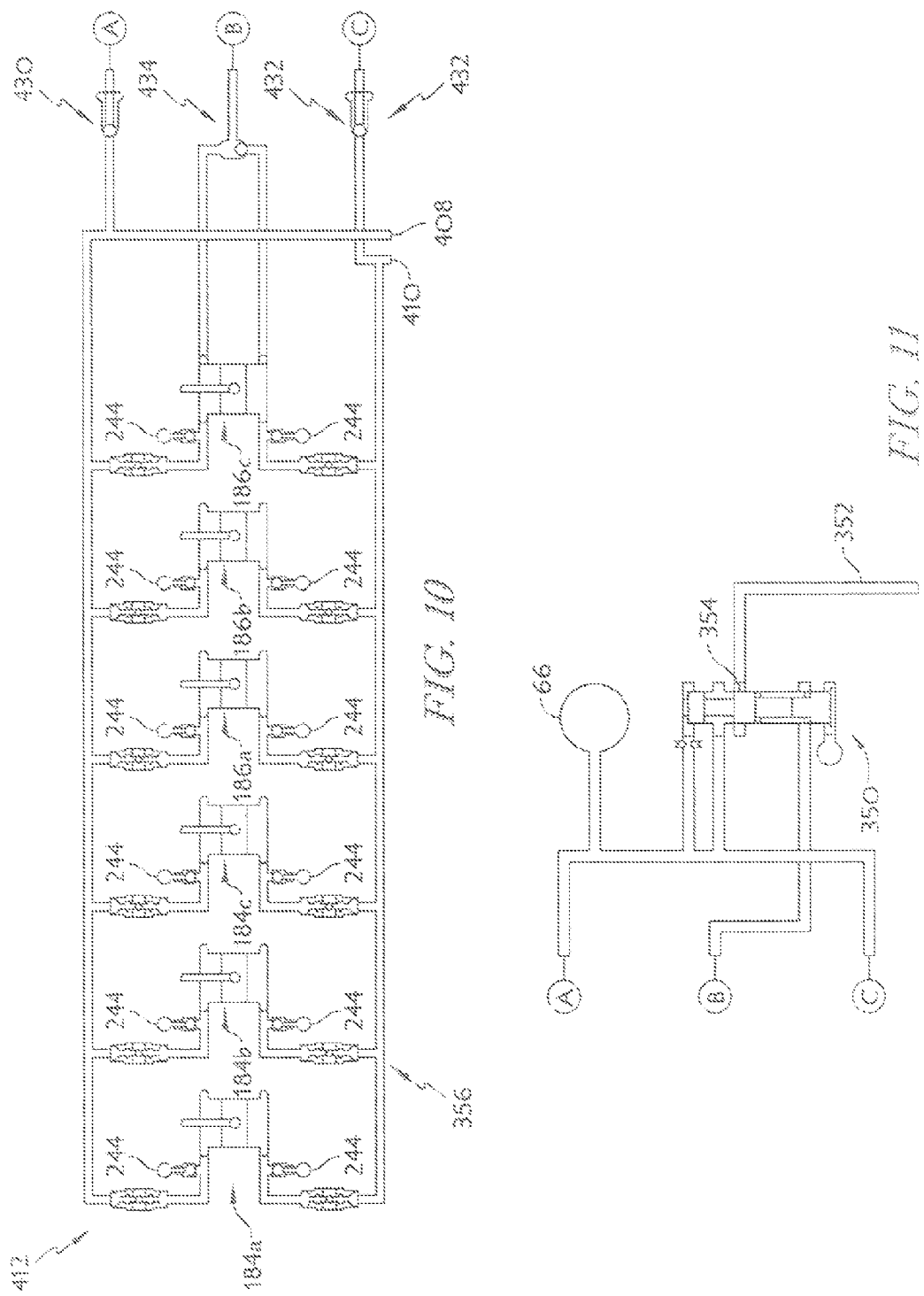

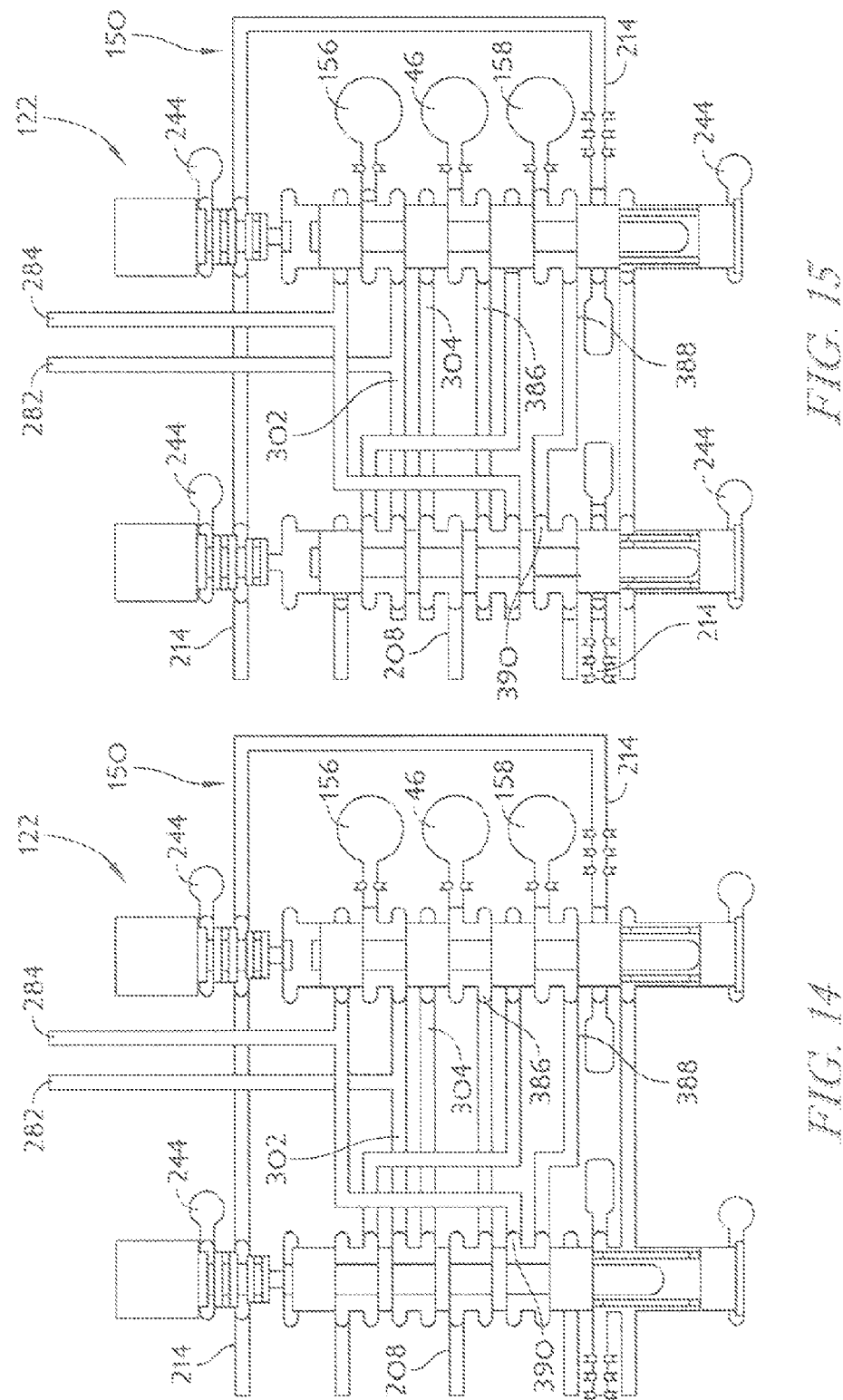

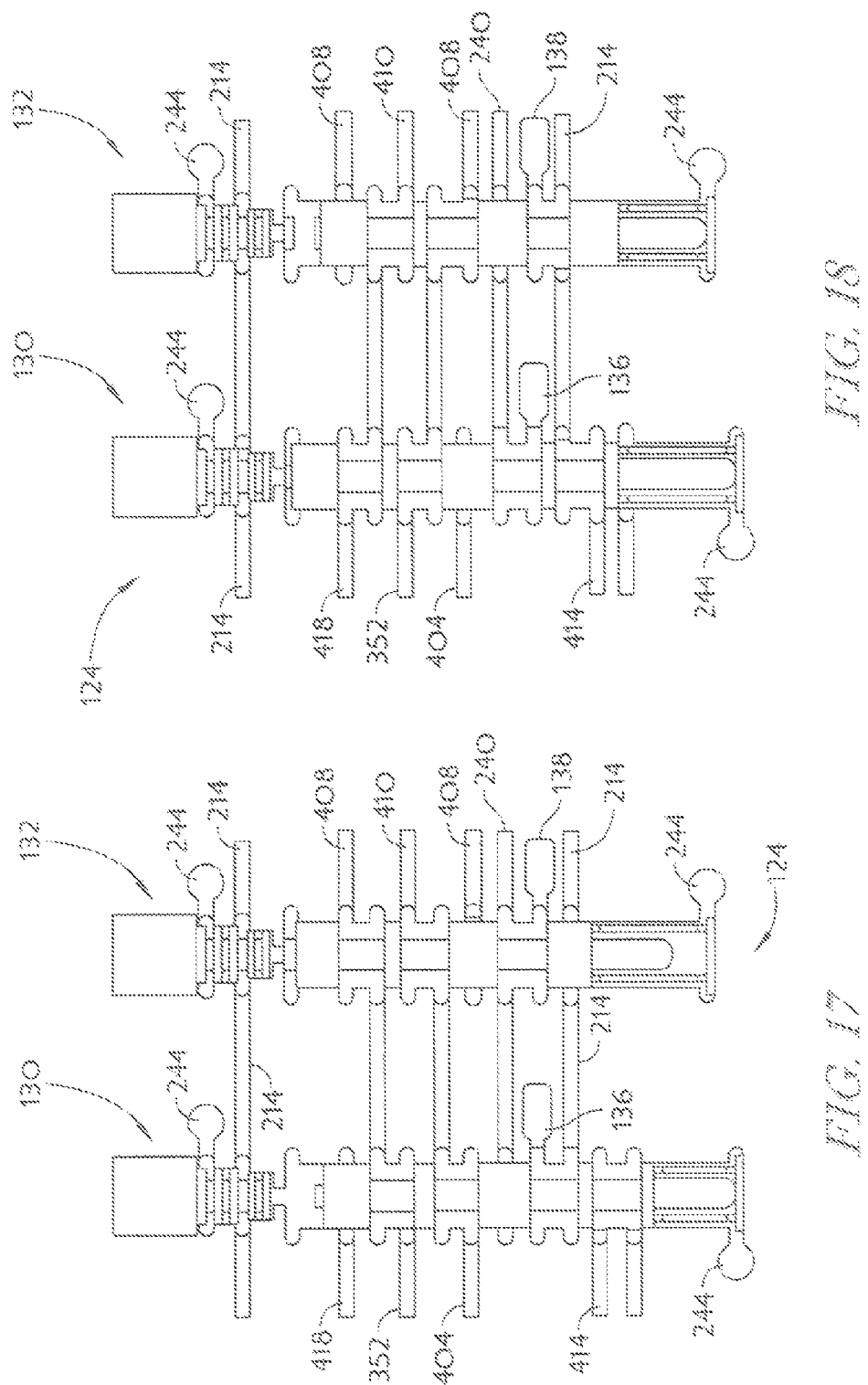

| HYDRAULIC FAILURE | HOT | | | | | |
|---|---|---|---|---|---|---|
| | H NL 0 0 | H NL 1 - | H NL 1 + | H NH T FR | H NH 2 + | H NH 2 - |
| VALVE 142 FAULT | DETECTED, NO RESPONSE NECESSARY | | | | | |
| VALVE 144 FAULT | C NL 0 0 | C NL 1 - | C NL 1 + | C NH T FR | C NH 2 + | C NH 2 - |
| VALVE 168 FAULT | H FL 0 0 | H FH 1 - | H FH 1 + | H FH 1 + | H FH 2 + | H FH 2 - |
| VALVE 170 FAULT | H FL 0 0 | H NH 1 - | H NH 1 + | H NH 1 + | H FH 2 + | H FH 2 - |
| VALVE 130 OR 132 FAULT | C NL 0 0 | C NL 1 - | C NL 1 + | C NH T FR | C NH 2 + | C NH 2 - |
| VALVE 160 OR 162 FAULT | H FL 0 0 | H FL 1 - | H FL 1 + | H FH T FR | H FH 2 + | H FH 2 - |
| VALVE 148 FAULT | C NL 0 0 | C NL 1 - | C NL 1 + | C NH T FR | C NH 2 - | C NH 2 - |
| DRIVER 1 FAULT | H FL 0 0 | H FH 1 - | H FH 1 + | H NH 1 + | NO RESPONSE NECESSARY | |
| DRIVER 2 FAULT | C NL 0 0 | C NL 1 - | C NL 1 + | C NH T FR | C FH 2 + | C FH 2 - |
| DRIVER 3 FAULT | C NL 0 0 | C NL 1 - | C NL 1 + | C NH T FR | C NH 2 + | C NH 2 - |
| DRIVER 4 FAULT | NO DETECTION | NO DETECTION | C FH T FR | C FH 2 + | H FH 2 - | |

FIG. 23

| HYDRAULIC FAILURE | COLD | | | | | |
|---|---|---|---|---|---|---|
| | C NL O 0 | C NL 1 - | C NL 1 + | C NH T FR | C NH 2 + | C NH 2 - |
| VALVE 142 FAULT | 1 NL O 0 | 1 NL 1 - | 1 NL 1 + | 1 NH T FR | 1 NH 2 + | 1 NH 2 - |
| VALVE 144 FAULT | DETECTED, NO RESPONSE NECESSARY | | | | | |
| VALVE 168 FAULT | C FL O 0 | C FH 1 - | C FH 1 + | C FH 1 + | C FH 2 + | C FH 2 - |
| VALVE 170 FAULT | C FL O 0 | C NH 1 - | C NH 1 + | C NH 1 + | C FH 2 + | C FH 2 - |
| VALVE 130 OR 132 FAULT | 1 NL O 0 | 1 NL 1 - | 1 NL 1 + | 1 NH T FR | 1 NH 2 + | 1 NH 2 - |
| VALVE 160 OR 162 FAULT | C FL O 0 | C FL 1 - | C FL 1 + | C FH T FR | C FH 2 + | C FH 2 - |
| VALVE 148 FAULT | NOT DETECTED, NO RESPONSE NECESSARY | | | | | |
| DRIVER 1 FAULT | 1 FL O 0 | 1 FH 1 - | 1 FH 1 + | 1 FH 1 + | 1 NH 2 + | 1 NH 2 - |
| DRIVER 2 FAULT | | C NH 1- | C NH 1 + | C NH 1 - | C FH 2 + | C FH 2 - |
| DRIVER 3 FAULT | NOT DETECTED, NO RESPONSE NECESSARY | | | | | |
| DRIVER 4 FAULT | NO DETECTION AVAILABLE | 1 NL 1 + | 1 NL 1 + | C FH T FR | C FH 2 + | H FH 2 - |

*FIG. 24*

| HYDRAULIC FAILURE | H NO S1 | H NO S2 | H N1 S1 | H N1 S2 | H N12 S1 | H N12 S2 | H N2 S1 | H N2 S2 | H N23 S1 | H N23 S2 | H N3 S1 | H N3 S2 |
|---|---|---|---|---|---|---|---|---|---|---|---|---|
| VALVE 142 FAULT | DETECTED, NO RESPONSE NECESSARY | | | | | | | | | | | |
| VALVE 144 FAULT | C NO S1 | C NO S2 | C N1 S1 | C N1 S2 | C N12 S1 | C N12 S2 | C N2 S1 | C N2 S2 | C N23 S1 | C N23 S2 | C N3 S1 | C N3 S2 |
| VALVE 168 FAULT | AC NO S1 | AC NO S2 | H A1 S1 | H A1 S2 | | | H A2 S1 | H A2 S2 | | | H A3 S1 | H A3 S2 |
| VALVE 170 FAULT | AC NO S1 | AC NO S2 | H A1 S1 | H A1 S2 | | | H A2 S1 | H A2 S2 | | | H A3 S1 | H A3 S2 |
| VALVE 130 OR 132 FAULT | C NO S1 | C NO S2 | C N1 S1 | C N1 S2 | C N12 S1 | C N12 S2 | C N2 S1 | C N2 S2 | C N23 S1 | C N23 S2 | C N3 S1 | C N3 S2 |
| VALVE 552 OR 554 FAULT | AC NO S1 | AC NO S2 | AC A1 S1 | AC A1 S2 | AC A12 S1 | AC A12 S2 | AC A2 S1 | AC A2 S2 | AC A23 S1 | AC A23 S2 | AC A3 S1 | AC A3 S2 |
| VALVE 556 FAULT | | | AC A1 S1 | AC A1 S2 | AC A12 S1 | AC A12 S2 | | | AC A23 S1 | AC A23 S2 | AC A3 S1 | AC A3 S2 |
| VALVE 148 FAULT | C NO S1 | C NO S2 | C N1 S1 | C N1 S2 | C N12 S1 | C N12 S2 | C N2 S1 | C N2 S2 | C N23 S1 | C N23 S2 | C N3 S1 | C N3 S2 |
| DRIVER 1 FAULT | X NO S1 | X NO S2 | C F3L S1 | C F3L S2 | | | C N2 S1 | C N2 S2 | C N23 S1 | C N23 S2 | C N3 S1 | C N3 S2 |
| DRIVER 2 FAULT | AC NO S1 | AC NO S2 | AC A1 S1 | AC A1 S2 | AC A12 S1 | AC A12 S2 | AC N2 S1 | AC N2 S2 | | | AC A3 S1 | AC A3 S2 |
| DRIVER 3 FAULT | C NO S1 | C NO S2 | C N1 S1 | C N1 S2 | | | C A2 S1 | C A2 S2 | | | C N3 S1 | C N3 S2 |
| DRIVER 4 FAULT | Y NO S1 | Y NO S2 | C A1 S1 | C A1 S2 | AC A12 S1 | AC A12 S2 | C A2 S1 | C A2 S2 | AC A23 S1 | AC A23 S2 | C A3 S1 | AC A3 S2 |

FIG. 25

| HYDRAULIC FAILURE | C NO S1 | C NO S2 | C N1 S1 | C N1 S2 | C N12 S1 | C N12 S2 | C N2 S1 | C N2 S2 | C N23 S1 | C N23 S2 | C N3 S1 | C N3 S2 |
|---|---|---|---|---|---|---|---|---|---|---|---|---|
| VALVE 142 FAULT | AC NO S1 | AC NO S2 | AC N1 S1 | AC N1 S2 | AC N12 S1 | AC N12 S2 | AC N2 S1 | AC N2 S2 | AC N23 S1 | AC N23 S2 | AC N3 S1 | AC N3 S2 |
| VALVE 144 FAULT | DETECTED, NO RESPONSE NECESSARY | | | | | | | | | | | |
| VALVE 168 FAULT | AC NO S1 | AC NO S2 | AC N1 S1 | AC A1 S2 | | | AC A2 S1 | AC A2 S2 | | | AC A3 S1 | AC A3 S2 |
| VALVE 170 FAULT | AC NO S1 | AC NO S2 | AC N1 S1 | AC A1 S2 | | | | AC A2 S2 | | | | AC A3 S2 |
| VALVE 130 OR 132 FAULT | I NL 0 | I NL 1- | I NL 1+ | I NL 1 TFR | I NL 2- | I NL 2- | | | | | | |
| VALVE 552 OR 554 FAULT | AC NO S1 | AC NO S2 | AC N1 S1 | AC A1 S2 | AC A12 S1 | AC A12 S2 | AC A2 S1 | AC A2 S2 | AC A23 S1 | AC A23 S2 | AC A3 S1 | AC A3 S2 |
| VALVE 556 FAULT | | | AC A1 S1 | AC A1 S2 | AC A12 S1 | AC A12 S2 | AC A2 S1 | AC A2 S2 | AC A23 S1 | AC A23 S2 | AC A3 S1 | AC A3 S2 |
| VALVE 148 FAULT | NOT DETECTED, NO RESPONSE NECESSARY | | | | | | | | | | | |
| DRIVER 1 FAULT | X NO S1 | X NO S2 | C F3L S1 | C F3L S2 | | | C N2 S1 | C N2 S2 | | | C N3 S1 | C N3 S2 |
| DRIVER 2 FAULT | AC NO S1 | AC NO S2 | AC N1 S1 | AC N1 S2 | | | AC N2 S1 | AC N2 S2 | | | AC A3 S1 | AC A3 S2 |
| DRIVER 3 FAULT | | | | | | | C A2 S1 | C A2 S2 | | | | |
| DRIVER 4 FAULT | Y NO S1 | Y NO S2 | C A1 S1 | AC A1 S2 | AC A12 S1 | AC A12 S2 | C A2 S1 | C A2 S2 | AC A23 S1 | AC A23 S2 | C A3 S1 | AC A3 S2 |

FIG. 26

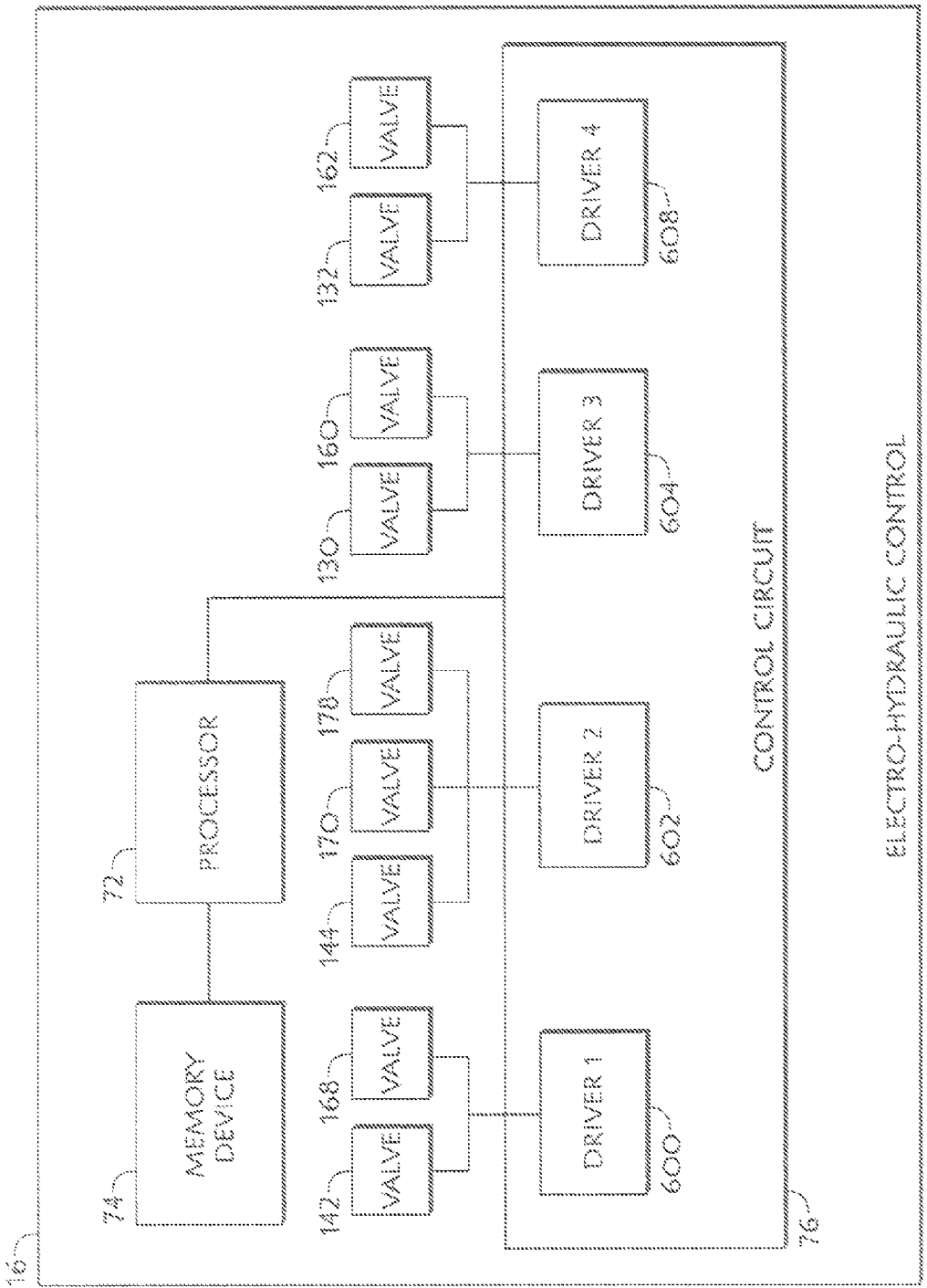

COLD OPERATION MODE CONTROL FOR AN IVT

CROSS-REFERENCE TO RELATED U.S. PATENT APPLICATION

This present application claims priority under 35 U.S.C. §119(e) to U.S. Provisional Patent Application Ser. No. 61/660,666, entitled "REDUNDANT VARIATOR CONTROL FOR AN IVT," which was filed on Jun. 15, 2012, the entirety of which is hereby incorporated by reference.

TECHNICAL FIELD

The present invention relates generally to fault responses in a multi-mode automatic transmission that includes a toroidal traction drive including a variator. More specifically, the present invention relates to control system for bypassing faults in the multi-mode automatic transmission to permit continued operation of the multi-mode automatic transmission in single fault conditions.

BACKGROUND

In some vehicle transmissions, a ratio varying unit ("variator") is used to provide a continuous variation of transmission ratio rather than a series of predetermined ratios. These transmissions may be referred to as continuously variable transmissions, infinitely variable transmissions, toroidal transmissions, continuously variable transmissions of the full toroidal race-rolling traction type, or similar terminology. In such transmissions, the variator is coupled between the transmission input and the transmission output via gearing and one or more clutches. In the variator, torque is transmitted by the frictional engagement of variator disks and rollers separated by a traction fluid.

The variator torque is controlled by a hydraulic circuit, which includes hydraulic actuators (i.e., pistons) that apply an adjustable force to the rollers. The force applied by the hydraulic actuator is balanced by a reaction force resulting from the torques transmitted between the surfaces of the variator disks and the rollers. The end result is that in use, each roller moves and precesses to the location and tilt angle required to transmit a torque determined by the force applied by the hydraulic actuators. A difference in the forces applied to the rollers changes the rollers' tilt angle and thus, the variator ratio. A change in the rollers' tilt angle thus results not only in a net torque at the transmission output but could also result in a change in torque direction. The direction of the torque output determines whether the torque application is positive or negative.

SUMMARY

The present application discloses one or more of the features recited in the appended claims and/or the following features which, alone or in any combination, may comprise patentable subject matter:

According to an aspect of the present disclosure, an electro-hydraulic controller for a multi-mode transmission including a continuously variable transmitter operating in tandem with a countershaft assembly an electro-hydraulic system with a variator control that boosts pressure to the variator while the transmission operates in a cold mode.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 10 is a schematic of a portion of the hydraulic circuit of the transmission associated with the control of the variator;

FIG. 11 is a schematic of the remainder of the hydraulic circuit associated with the control of the variator not shown in FIG. 10;

FIG. 14 is a schematic of the mode logic control section of the mode control portion of the hydraulic circuit of the transmission showing a second mode logic valve in a stroked state;

FIG. 15 is a schematic of the mode logic control section of the mode control portion of the hydraulic circuit of the transmission showing both mode logic valves in a stroked state;

FIG. 17 is a schematic of the variator logic control section of the variator control portion of the hydraulic circuit of the transmission showing a first variator logic valve in a stroked state;

FIG. 18 is a schematic of the variator logic control section of the variator control portion of the hydraulic circuit of the transmission showing a second variator logic valve in a stroked state;

FIG. 23 is a table showing a system response to a single point failure when a first embodiment of transmission is operating under normal conditions, hydraulic fault conditions shown in the left column, desired transmission states shown across the top of the remaining columns, and the respective response state shown in the table;

FIG. 24 is a table showing a system response to a single point failure when a first embodiment of transmission is operating under cold operating conditions, hydraulic fault conditions shown in the left column, desired transmission states shown across the top of the remaining columns, and the respective response state shown in the table;

FIG. 25 is a table showing a system response to a single point failure when a second embodiment of transmission is operating under normal conditions, hydraulic fault conditions shown in the left column, desired transmission states shown across the top of the remaining columns, and the respective response state shown in the table;

FIG. 26 is a table showing a system response to a single point failure when a second embodiment of transmission is operating under cold operating conditions, hydraulic fault conditions shown in the left column, desired transmission states shown across the top of the remaining columns, and the respective response state shown in the table;

FIG. 27 is a diagrammatic representation of a portion of the control circuit of the first embodiment of transmission.

DETAILED DESCRIPTION OF THE DRAWINGS

Figure 1:
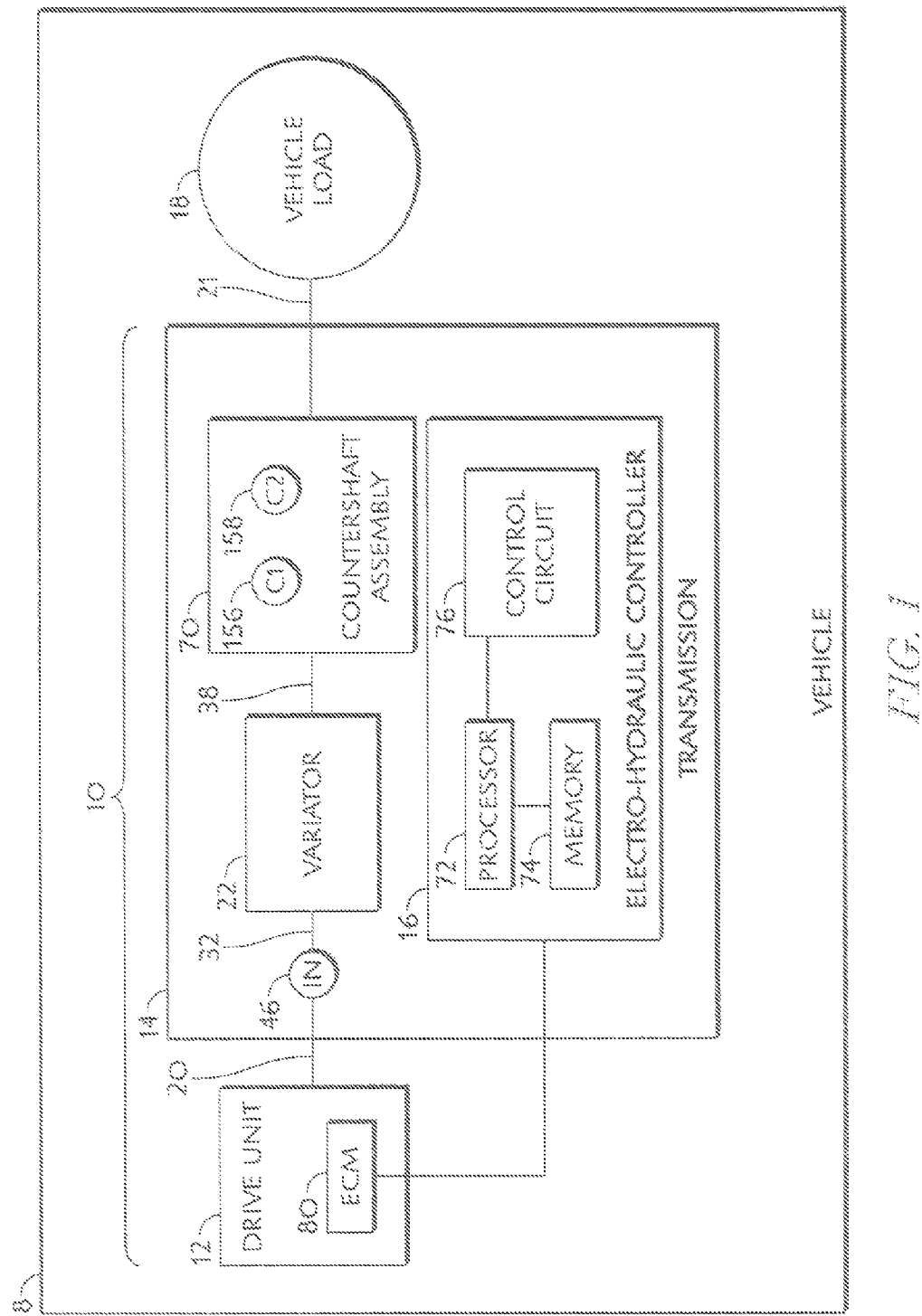
FIG. 1 is a block diagram of a vehicle that includes a drive unit, a transmission receiving rotational input from the drive unit, the transmission converting the rotational input from the drive unit and applying an output to a vehicle load to control the speed and direction of travel of the vehicle under varying conditions.

For the purposes of promoting an understanding of the principles of the invention, reference will now be made to a number of illustrative embodiments shown in the attached drawings and specific language will be used to describe the same.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In one embodiment, a drive train 10 of a vehicle 8 includes a drive unit 12 and a transmission 14 configured to drive a vehicle load 18 as shown in FIG. 1. The transmission 14 includes an electro-hydraulic controller 16 coupled to an engine control module (ECM) 80 of the drive unit 12 to coordinate the operation of the drive unit 12 and the transmission 14. In some embodiments, the drive train 10 may include other components commonly found in drive trains but not illustrated in FIG. 1 in order to increase clarity of the present description.

The drive unit 12 is illustratively a diesel internal combustion engine. However, in other embodiments, the drive unit 12 may be embodied as a spark-ignition type internal combustion engine (i.e. gasoline engine), a hybrid engine-electric motor combination, or another source of rotational power. The drive unit 12 has drive unit output shaft 20 that provides rotational power to the transmission 14.

The transmission 14 is operable to transmit the rotational power from the drive unit 12 to the vehicle load 18 at various transmission ratios. The transmission ratio provided by the transmission 14 is modified by the electro-hydraulic controller 16. The electro-hydraulic controller 16 is configured to modify the transmission ratio so that the drive unit 12 operates at an optimized set of parameters corresponding to the vehicle load 18 and speed of the vehicle 8.

The transmission 14 illustratively includes an input clutch 46, a variator 22, and a countershaft assembly 70 with two clutches 156, 158 operable to change the ratio of the transmission 14 under the control of the electro-hydraulic controller 16. The input clutch 46 is configured to be stroked to transfer rotation to the variator 22 from the drive unit output shaft 20. The transmission 14 is embodied as a continuously variable countershaft transmission unit as is known in the art. In other embodiments, the transmission 14 may be an infinitely variable transmission. The ratio through the transmission 14 is adjustable by selectively energizing the clutches 156, 158 in the countershaft assembly 70 and by varying the ratio of an input 32 to the variator 22 to an output 38 of the variator 22 as described below. The variator 22 is an infinitely variable rotational transmitter that is operable to vary the ratio through the variator 22 under the control of the electro-hydraulic controller 16. The countershaft assembly 70 receives rotational output from an output 38 of the variator 22 and acts as a rotational transmitter to transmit the rotation from the output 38 of the variator 22 to the vehicle load 18. In the illustrative embodiment, the countershaft assembly 70 includes at least one epicyclic gear set that may, under certain conditions, reverse the direction of output from the variator 22. Thus, the transmission 14 is operable to receive rotational input from the drive unit 12 and convert that rotational input to positive or negative rotational output to the vehicle load 18, including operating at a geared neutral condition.

Figure 2:
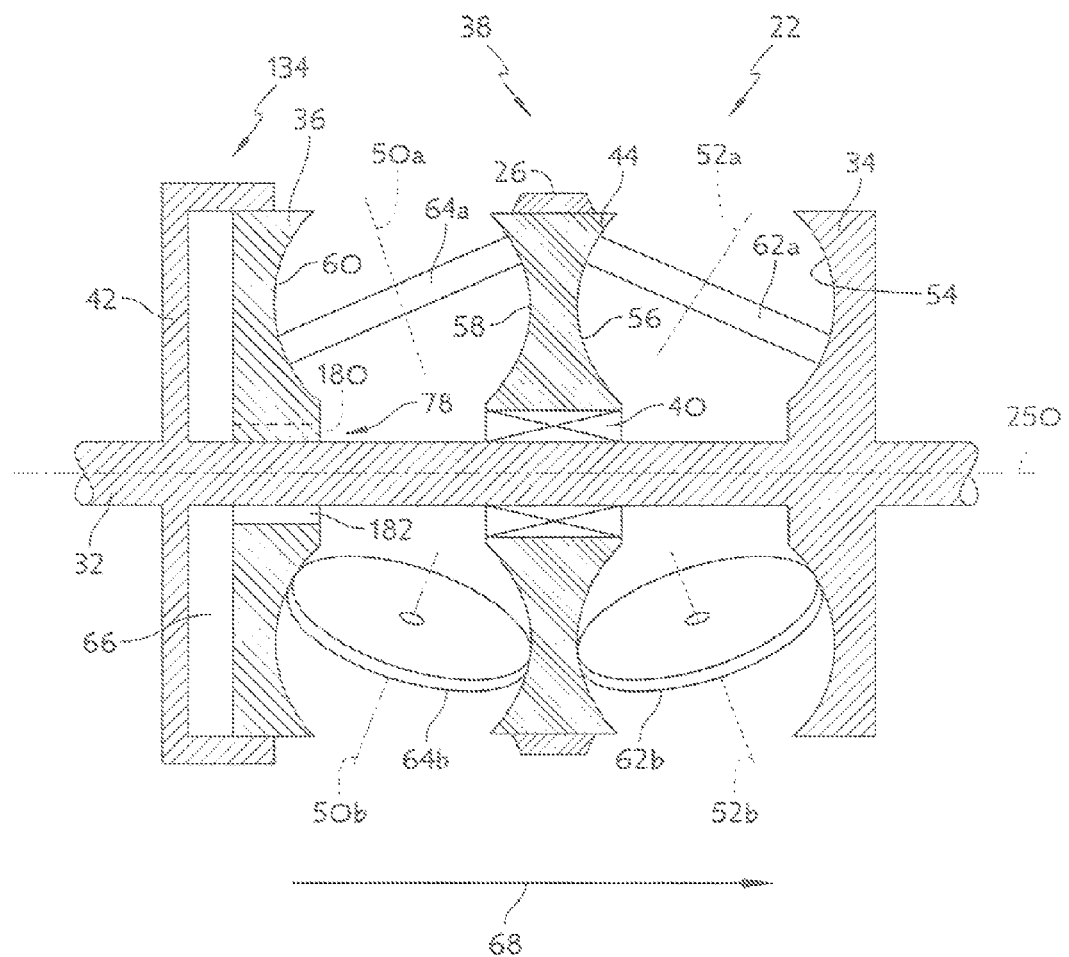
FIG. 2 is a diagrammatic representation of a variator of the transmission of FIG. 1, the variator operable as a continuously variable rotational transmitter and operable to vary a ratio of rotational input to rotational output when the transmission is operated.

As illustratively shown in FIG. 2, the variator 22 includes an input shaft 32 that is selectively coupleable to the drive unit output shaft 20 through the input clutch 46 of the transmission 14. The variator 22 includes a first input race 34 and a second input race 36, each of which is coupled to the input shaft 32 to rotate with the input shaft 32 about a rotation axis 250. Each of the races 34 and 36 is a disk centered on the axis 250. The input race 34 is formed to include a race surface 54 that is engaged by three rollers 62a, 62b, and 62c (not shown in FIG. 2). Similar to input race 34, input race 36 is formed to include a race surface 60 which cooperates with three rollers 64a, 64b, 64c (not shown in FIG. 2). As will be discussed in further detail below, the engagement between the race surfaces 54 and 60 and the respective rollers 62a, 62b, 62c, 64a, 64b, 64c does not require contact between the rollers 62a, 62b, 62c, 64a, 64b, 64c and the respective race surfaces 54 and 56.

As the input shaft 32 rotates about the axis 250, the input races 34 and 36 rotate with the input shaft 32 and the engagement with the rollers 62a, 62b, 62c, 64a, 64b, 64c transfers rotation of the races 34 and 36 to the respective rollers 62a, 62b, 62c, 64a, 64b, 64c. Each of the rollers 62a, 62b, 62c, 64a, 64b, 64c rotates about a respective axis 52a, 52b, 52c (not shown) and 50a, 50b, and 50c (not shown). As will be described in further detail below, each of the axes 52a, 52b, 52c, 50a, 50b, 50c are pivotable to thereby change the position of the respective rollers 62a, 62b, 62c, 64a, 64b, 64c relative to the input races 34 and 36. It should be understood that the rotation of the rollers 62a, 62b, 62c, 64a, 64b, 64c is controlled such that each of the rollers 62a, 62b, 62c, 64a, 64b, 64c rotates at substantially the same speed as the orientation of the axes 52a, 52b, 52c, 50a, 50b, 50c is coordinated as described herein.

The variator 22 further includes an output 38 which includes an output race 44 supported on the input shaft 32 on roller bearings 40 so that the output 38 is supported on the input shaft 32 but is rotatable relative to the input shaft 32. Illustratively, the output 38 is formed to include a number of gear teeth 26 positioned about the periphery of the output race 44, with the gear teeth 26 configured transfer output rotations to a complementary gear coupled to the countershaft assembly 70 of the transmission 14. It should be understood that the output 38 may take other forms and may be fixed to the input shaft 32 in other embodiments.

The variator 22 includes an endload assembly 134 that includes a housing 42. The endload assembly 134 includes a endload chamber 66 that is pressurized to apply a force to the input race 36 that acts on the rollers 62a, 62b, 62c, 64a, 64b, 64c and output race 44 to clamp the rollers 62a, 62b, 62c, 64a, 64b, 64c and output race 44 between the input race 36 and the input race 34. The clamp force between the input race 36 and the input race 34 is variable as will be described. In the illustrative embodiment, the input race 34 is fixed to the input shaft 32 and the input race 36 is movable to increase the clamp load.

The input race 36 forms part of the endload assembly 134 and is movable relative to the input shaft 32 along axis 250 in a direction indicated by an arrow 68. An endload chamber 66 is pressurized with hydraulic fluid to apply a force to the input race 36 urging it in the direction of arrow 68. The input race 36 is engaged with the input shaft 32 through a splined connection 78. The splined connection 78 includes the engagement of a number of splines 180 formed in the input race 36 which engage a number of splines 182 on the input shaft 32. Rotation is transferred to the input race 36 from the input shaft 32 through the splined connection 78, but the input race 36 is permitted to move along the input shaft 32 when the endload chamber 66 is pressurized. It should be understood that FIG. 2 is a diagrammatic representation of the variator 22. In actual operation, the movement of the race 36 will be very slight and only of sufficient magnitude to transfer the pressure of the hydraulic fluid in the endload chamber 66 to the rollers 62a, 62b, 62c, 64a, 64b, 64c, the output 38, and the first input race 34. The magnitude of pressure in the endload chamber 66 varies the clamp force applied to the variator 22 to reduce or eliminate relative movement between the rollers 62a, 62b, 62c, 64a, 64b, 64c, and the race surfaces 54, 56, 58, 60. Those of ordinary skill in the art will recognize that a greater clamping force will tend to increase the rolling resistance between the rollers 62a, 62b, 62c, 64a, 64b, 64c, and the race surfaces 54, 56, 58, and 60. As such, it is necessary to limit the clamping force to only that which is necessary to limit relative movement between the rollers 62a, 62b, 62c, 64a, 64b, 64c, and the race surfaces 54, 56, 58, and 60. The clamping force will vary depending on the load variation between the output 38 and the input shaft 32.

Figure 3:
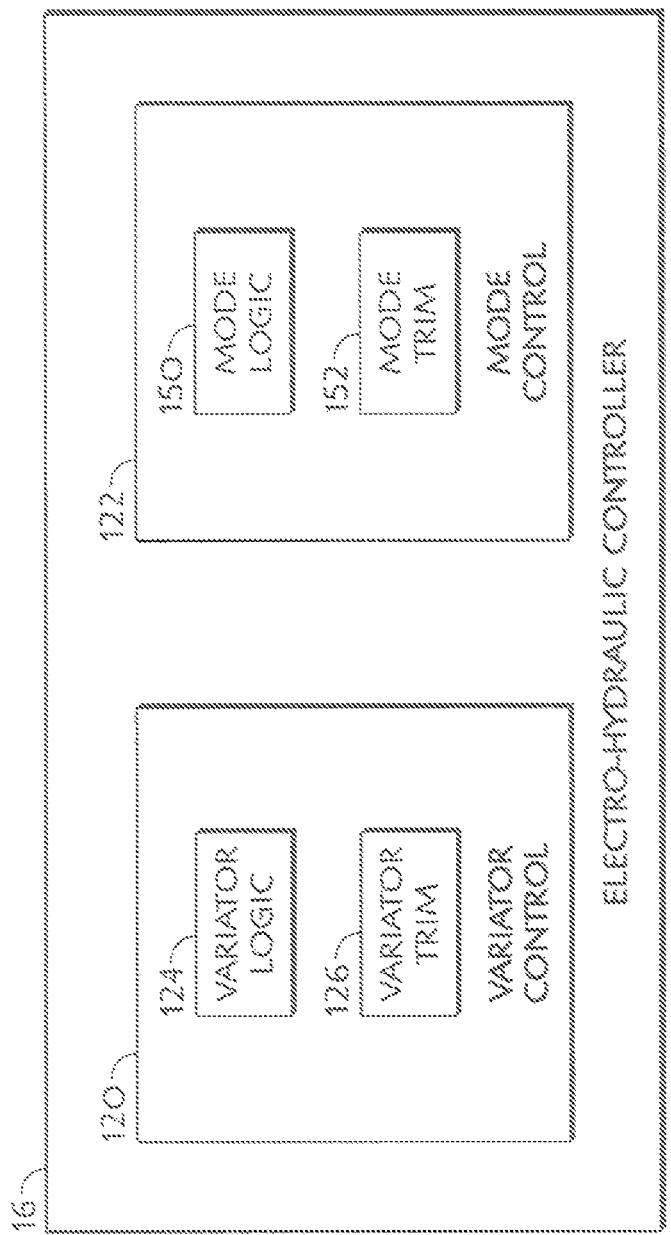
FIG. 3 is a functional block diagram of an electro-hydraulic controller of the transmission.

Referring now to FIG. 3, the electro-hydraulic controller 16 includes two functions: a variator control 120 and a mode control 122. The variator control 120 is operable to control operation of the variator 22 under changing operating conditions. Control of the variator 22 by the variator control 120 is accomplished by a variator logic section 124 and a variator trim section 126. The variator control 120 controls the position of the axes 50a, 50b, 50c, 52a, 52b, 52c to control the ratio transmitted through the variator 22 from input shaft 32 to the output 38. Under certain conditions, the variator control 120 applies pressure in a first direction, depending on the direction of torque being applied to the output 38 of the variator 22. As is known in the art, a variator, such as variator 22 operates in a single operational direction and a negative torque condition must be addressed in the variator 22 to prevent rotation of the variator 22 in a negative direction, which might cause damage to the variator 22.

The variator trim section 126 controls the magnitude of pressure applied to six cylinders 184a, 184b, 184c, 186a, 186b, and 186c (shown in FIG. 10) each of which is associated with a corresponding axis 50a, 50b, 50c, 52a, 52b, 52c to vary the position of the axes 50a, 50b, 50c, 52a, 52b, 52c to thereby change the ratio of the variator 22. By varying the pressure applied to the cylinders 184a, 184b, 184c, 186a, 186b, and 186c (shown in FIG. 10), the variator trim section 126 overcomes resistance to movement of the axes 50a, 50b, 50c, 52a, 52b, 52c to thereby change the position of the rollers 62a, 62b, 62c, 64a, 64b, 64c. As described above, the position of the rollers 62a, 62b, 62c, 64a, 64b, 64c defines the ratio transmitted through the variator 22. Application of additional pressure causes the rollers 62a, 62b, 62c, 64a, 64b, 64c to move toward a new position until the resistance of movement of the rollers 62a, 62b, 62c, 64a, 64b, 64c is in equilibrium with the pressure applied to the cylinders 184a, 184b, 184c, 186a, 186b, and 186c as determined by the electro-hydraulic controller 16. When equilibrium is reached, the ratio through the variator 22 is maintained until a change in torque is applied to the output 38 of the variator 22, at which time the equilibrium will be lost and the electro-hydraulic controller 16 will respond to the loss of equilibrium by moving the cylinders. 184a, 184b, 184c, 186a, 186b, and 186c to a new position to reach a new equilibrium.

The variator 22 of the illustrative embodiment is operates as a continuously variable transmitter (CVT). In other embodiments, other configurations of CVT may be substituted and still be within the scope of the present disclosure. Other CVT's with hydraulically actuated variation are susceptible to the application of the controls of the present disclosure; to the extent such systems are subject to single fault conditions.

The electro-hydraulic controller 16 includes a processor 72 that is in communication with the ECM 80 of the drive unit 12 and a control circuit 76 that controls the electrical components of the electro-hydraulic controller 16. The processor 72 is operable to receive information from the ECM 80 indicative of the desired operation of the vehicle 8, such as a speed input from a foot pedal, engine speed, desired transmission operating mode, or other information. The information may be provided as discreet inputs or may be provided as serial data or network messages. For example, the electro-hydraulic controller 16 may communicate to with the ECM 80 through a serial interface such as an I²C, SPi, LIN bus, or other similar serial interface. In other embodiments, the electro-hydraulic controller 16 may communicate with the ECM 80 over a controller area network (CAN) or other higher level network.

The processor 72 accesses instructions in a memory device 74 and processes the instructions to control operation of the control circuit 76 and associated components as will be described. The control circuit 76 includes devices necessary to convert digital instructions from the processor 72 to outputs usable by the components of the electro-hydraulic controller 16. For example, the control circuit 76 may include relays or other logical devices which respond to a digital signal from the processor to operate any analog components of the electro-hydraulic controller 16. Similarly, the control circuit 76 may include filters, amplifiers, and other devices necessary to convert analog signals from pressure sensors to a digital signal for the processor 72. In addition, the control circuit 76 includes speed sensors (not shown) that determine the input speed to the transmission 14 which is determined by measuring the speed of the drive unit output shaft 20; at the output 38 of the variator 22, and at an output shaft 21 of the transmission 14. The processor 72 utilizes the speed information as part of the logical operation of the electro-hydraulic controller 16 to determine the torque applied to the output 38 of the variator 22 to make decisions regarding appropriate operating conditions for the transmission 14.

Figure 4:
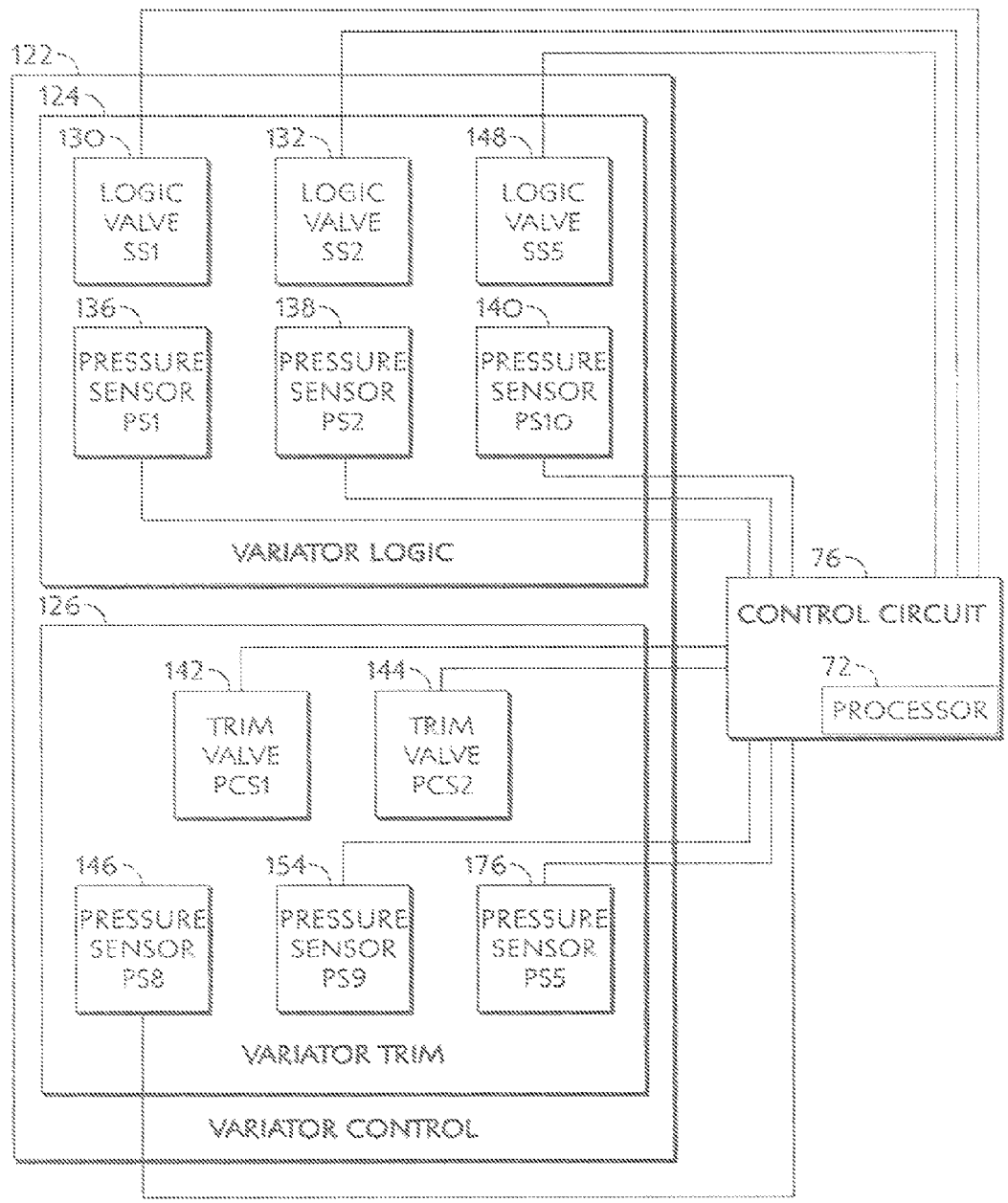
FIG. 4 is a block diagram of components of a variator control of the electro-hydraulic controller of the transmission.
Figure 5:
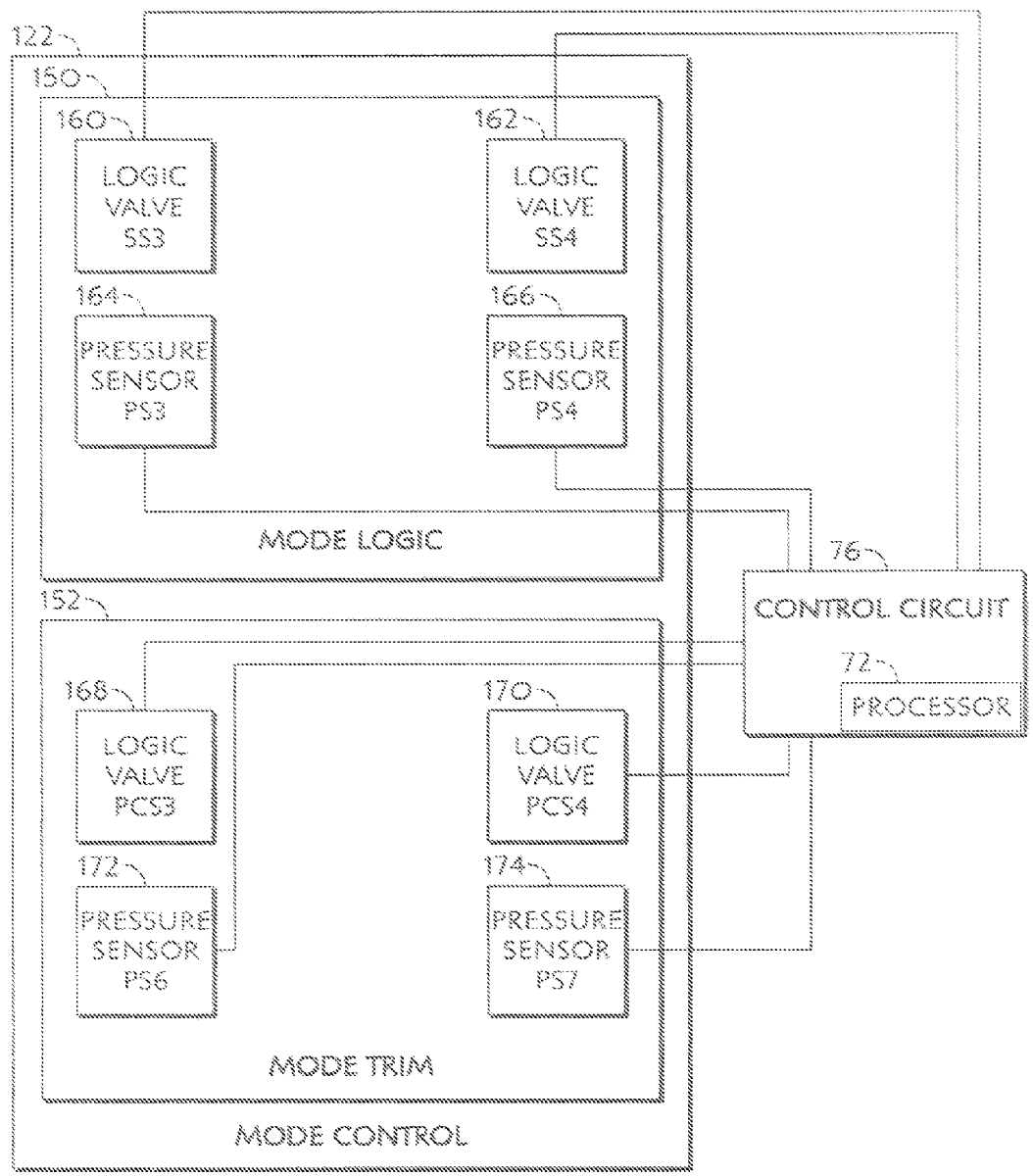
FIG. 5 is a block diagram of components of a mode control of the electro-hydraulic controller of the transmission.

As shown in FIG. 4, the variator logic section 124 comprises three valves, a first variator logic valve 130, a second variator logic valve 132, and a variator boost valve 148. Each of the variator logic valves 130, 132, and 148 are operatively coupled to the processor 72 through the control circuit 76 and are operated under the control of the processor 72. As will be discussed in further detail below, the first variator logic valve 130, and the second variator logic valve 132, cooperate to control the direction of flow of pressurized hydraulic pressure to the cylinders 184a, 184b, 184c, 186a, 186b, and 186c. The variator boost valve 148 is operable to provide a pressure boost to the variator trim control 126 when the transmission 14 is operating cold and valve 142 is in a fault condition to apply a boosted pressure to the hydraulic cylinders 184a, 184b, 184c, 186a, 186b, and 186c and the endload chamber 66. Each of the first variator logic valve 130, the second variator logic valve 132, and the variator boost valve 148 have two different logical states to thereby change the flow path of hydraulic fluid. The logic states of each of the valves 130, 132, and 148 change in response to changing operating conditions of the transmission 14. In addition, each valve 130, 132, and 148 has a respective pressure sensor 136, 138, and 140 associated with a respective variator logic valve 130, 132, and 148. Each sensor 136, 138, and 140 is positioned to sense the presence of pressure in the circuit to confirm that the each valve 130, 132, and 148 is operating as expected. The pressure sensors 136, 138, 140 are operatively coupled to the processor 72 through the control circuit 76 and are operable to provide a signal indicative of the pressure sensed by each sensor to processor 72. The pressure sensors 136, 138, and 140 operate as fault detectors to determine if hydraulic fluid is flowing as expected. Because the valves 130, 132, and 148 are operated open-loop, i.e. without direct feedback from the valve 130 132, 148 to confirm that the valve has responded to a signal to energize, the actual position of the valve is not known by the processor 72 of the electro-hydraulic controller 16. The pressure sensors 136, 138, and 140 provide feedback to the electro-hydraulic controller 16 to confirm the variator control 120 is operating as expected by confirming that the variator logic valves 130, 132 and 148 are stroked or de-stroked as expected by the processor 72. In the illustrative embodiment, the pressure sensors 136, 138, and 140 are pressure switches that activate once a minimum pressure has been applied to the switch. In other embodiments, the pressure sensors 136, 138, and 140 may be embodied as transducers providing a variable signal indicative of the pressure in the system.

The variator trim section 126 includes a first variator trim valve 142 and a second variator trim valve 144. Each of the variator trim valves 142 and 144 has an associated pressure sensor 146 and 148. The pressure sensors 146 and 148 operate to provide feedback to the processor 72 electro-hydraulic controller 16 as to the operation of the respective variator trim valves 142 and 144 and the pressure applied to the cylinders 184a, 184b, 184c, 186a, 186b, and 186c. The variator trim valves 142 and 144 respond to changes in an input signal to vary the pressure output by the variator trim valves 142 and 144 and applied to the cylinders 184a, 184b, 184c, 186a, 186b, and 186c. In the illustrative embodiment, the pressure sensors 146 and 148 are pressure switches that activate once a minimum pressure has been applied to the switch. In other embodiments, the pressure sensors 146 and 148 may be embodied as transducers providing a variable signal indicative of the pressure in the system.

The mode control 122 has two functions including a mode logic section 150 and a mode trim control 152 which cooperate to control the operation of the input clutch 46, a first mode clutch 156, and a second mode clutch 158. The input clutch 46 is used to control the transfer of rotational input from the drive unit output shaft 20 to the transmission 14. The first mode clutch 156 and second mode clutch 158 are used to control the path that rotation is transferred from the variator 22 through the countershaft assembly 70 to control the ratio and direction of rotation transferred from the transmission 14 to the vehicle load 18. The mode logic section 150, under the control of the processor 72 of the electro-hydraulic controller 16, varies the flow path of pressurized hydraulic fluid to the first mode clutch 156 and the second mode clutch 158 to energize or de-energize the first mode clutch 156 and the second mode clutch 158 depending on operating conditions, faults, and user inputs.

The mode logic section 150 includes a first clutch logic valve 160 and a second clutch logic valve 162 which cooperates to control the fluid path for hydraulic fluid to the first mode clutch 156, second mode clutch 158, and input clutch 46 as will be described in further detail below. Each clutch logic valve 160 and 162 has an associated pressure sensor 164 and 166, respectively. The pressure sensors 164 and 166 function similarly to the pressure sensors 136, 138, and 140 described herein in that they provide a feedback signal to the processor 72 to confirm that the valves 160 and 162 are operating as expected.

The mode trim control 152 includes a first mode trim valve 168 and a second mode trim valve 170 that control the pressure fed to the first mode clutch 156, second mode clutch 158, and the input clutch 46 through the mode logic section 150. A pressure sensor 172 is associated with first mode trim valve 168 and a pressure sensor 174 is associated with second mode trim valve 170 with each of the pressure sensors 172 and 174 operable to determine if the flow path through valves 168 and 170 is as expected by the processor 72.

Referring now to FIG. 27, the control circuit 76 includes a first driver 600 that is operable to provide sufficient power to the first variator trim valve 142 and the first mode trim valve 168. The driver 600 includes circuitry to control the operation of the solenoids of the valves 142 and 168 under the control of the processor 72. The driver 600 may experience a fault that prevents proper operation of valves 142 and 168, but the electro-hydraulic controller 16 is responsive to a fault in the driver 600.

A second driver 602 is operable to power the second variator trim valve 144 and the second mode trim valve 170 as well as the boost valve 148. A third driver 604 is operable to power the first variator logic valve 130 and the first mode logic valve 160. A fourth driver 606 is operable to power the second variator logic valve 132 and the second mode logic valve 162.

The detailed operation of the hydraulic circuit of the electro-hydraulic controller 16 is best understood with reference to the operational states of the electro-hydraulic controller 16. Each operational state of the electro-hydraulic controller 16 is referenced by a four part state name that identifies the operational state of each of a number of aspects of the transmission 14.

In a first embodiment of transmission 14, the first aspect is defined by an operational state of the variator 22. "C" indicates that the variator 22 is operating in a cold condition. When the transmission 14 operates cold the viscosity of the hydraulic fluid between the rollers 62a, 62b, 62c, 64a, 64b, 64c and the race surfaces 54, 56, 58, and 60 is higher than under normal, hot operating conditions. The electro-hydraulic controller 16 compensates for this difference while the transmission 14 warms up. "H" indicates that the variator 22 is operating in a normal, hot condition. "1" indicates that the first variator trim valve 142 is in a fault condition. Thus, there are three different variator operational states identified by the first aspect.

The second aspect of the state name is defined by the clutch operational state. There are four clutch operational states with "NL" indicating that the clutch state is Normal Low; "NH" indicating that the clutch state is Normal High; "FL" indicating that the clutch state is Fault Low; and "FH" indicating that the clutch state is Fault High.

The third aspect of the state name is defined by the mode state with five different mode operational states. The absence of a character in the state name indicates that the mode operational state is Neutral. A "0" indicates that the transmission 14 mode is Mode 0. A "1" indicates Mode 1; a "2" indicates Mode 2; and a "T" indicates that the transmission is in Transition between Mode 1 and Mode 2, meaning that both Mode 1 and Mode 2 are active.

The final part in the state name indicates torque direction applied to the variator 22 by the vehicle load 18 through the countershaft assembly 70. The torque direction may change depending on whether the vehicle 8 is accelerating or operating on an upward incline as compared to deceleration or operating on a downward incline. "0" indicates that there is no torque applied, while "−" indicates a negative torque direction. "+" indicates a positive torque direction, while "FR" indicates that the transmission is operating in a fixed ratio, bypassing the variator 22 and using the countershaft assembly 70 only to transfer rotation through the transmission 14. The FR state of the torque occurs during the Transition mode.

Table 1 below lists the states for the transmission 14 using the state name convention described above.

TABLE 1

Normal States

| Mode - Torque Direction | Cold | Hot |
|---|---|---|
| Neutral Start | C NL 0 0 | H NL 0 0 |
| Mode 1 - Negative Torque | C NL 1 − | H NL 1 − |
| Mode 1 - Positive Torque | C NL 1 + | H NL 1 + |
| Mode Transition | C NH T FR | H NH T FR |
| Mode 2 - Negative Torque | C NH 2 − | H NH 2 − |
| Mode 2 - Positive Torque | C NH 2 + | H NH 2 + |

Table 2 shows the state names that are associated with a failure of the first variator trim valve 142

TABLE 2

142 Fault States

| Mode - Torque Direction | Cold | Hot |
|---|---|---|
| Neutral Start | 1 NL 0 0 | 1 NL 0 0 |
| Mode 1 - Negative Torque | 1 NL 1 − | 1 NL 1 − |
| Mode 1 - Positive Torque | 1 NL 1 + | 1 NL 1 + |
| Mode Transition | 1 NH T FR | 1 NH T FR |
| Mode 2 - Negative Torque | 1 NH 2 − | 1 NH 2 − |
| Mode 2 - Positive Torque | 1 NH 2 + | 1 NH 2 + |

Each state of the transmission can be defined by a state logic key which is a binary definition of the logic state of each of the valves 142, 144, 168, 170, 130, 132, 160, 162, and 148, in order. The variator trim valves 142 and 144 each have two states, "T" for the trim state and "0" for an open state. In the trim state, the 142 or 144 is operated by the processor 72 based on the torque sensed by the electro-hydraulic controller 16 so that the proper pressure is applied to the cylinders 184a, 184b, 184c, 186a, 186b, and 186c.

The proper operating state of the electro-hydraulic controller 16 is confirmed by comparing the status of the various pressure sensors 136, 138, 164, 166, 140, 278, 286, 146, 148, and 176 to expected values. The states of the pressure sensors 136, 138, 164, 166, 140, 278, 286, 146, 148, and 176 are defined with a binary status of "1" for the pressure sensor being "on" or active receiving an acceptable pressure signal, and "0" for being "off" or receiving no pressure signal, or a pressure signal that is too low. As described above, the pressure sensors 136, 138, 164, 166, 140, 278, 286, 146, 148, and 176 in the illustrative embodiment are pressure switches that activate when a predetermined pressure is applied to the sensor. In other embodiments, the pressure sensors 136, 138, 164, 166, 140, 278, 286, 146, 148, and 176 may detect variations in pressure and transmit a signal to the processor 72 that is indicative of the actual pressure being applied to the respective sensor. When the pressure sensors 136, 138, 164, 166, 140, 278, 286, 146, 148, and 176 detect variations in pressure, sufficient pressure applied to the pressure sensor is considered a "1" or "on" condition by logic of the electro-hydraulic controller 16. The normal operating states of the pressure sensors of the electro-hydraulic controller 16 are shown in Table 3 below.

TABLE 3

Normal Pressure Sensor States

| STATE NAME | 136 | 138 | 164 | 166 | 140 | 278 | 286 | 146 | 148 | 176 |
|---|---|---|---|---|---|---|---|---|---|---|
| C NL 0 0 | 0 | 0 | 0 | 0 | 0 | 1 | 0 | 0 | 1 | 0 |
| C NL 1 − | 0 | 0 | 0 | 0 | 0 | 1 | 1 | 0 | 1 | 0 |

TABLE 3-continued

Normal Pressure Sensor States

| STATE NAME | 136 | 138 | 164 | 166 | 140 | 278 | 286 | 146 | 148 | 176 |
|---|---|---|---|---|---|---|---|---|---|---|
| C NL 1 + | 0 | 1 | 0 | 0 | 0 | 1 | 1 | 0 | 1 | 0 |
| C NH T FR | 0 | 0 | 0 | 1 | 0 | 1 | 1 | 0 | 1 | 0 |
| C NH 2 + | 0 | 0 | 0 | 1 | 0 | 0 | 1 | 0 | 1 | 0 |
| C NH 2 − | 0 | 1 | 0 | 1 | 0 | 0 | 1 | 0 | 1 | 0 |
| H NL 0 0 | 1 | 1 | 0 | 0 | 0 | 1 | 0 | 1 | 0 | 0 |
| H NL 1 − | 1 | 1 | 0 | 0 | 0 | 1 | 1 | 1 | 0 | 0 |
| H NL 1 + | 1 | 0 | 0 | 0 | 0 | 1 | 1 | 1 | 0 | 0 |
| H NH T FR | 1 | 1 | 0 | 1 | 0 | 1 | 1 | 1 | 0 | 0 |
| H NH 2 + | 1 | 1 | 0 | 1 | 0 | 0 | 1 | 1 | 0 | 0 |
| H NH 2 − | 1 | 0 | 0 | 1 | 0 | 0 | 1 | 1 | 0 | 0 |

When the pressure sensors 136, 138, 164, 166, 140, 278, 286, 146, 148, and 176 meet the normal operating conditions defined above, the valves 142, 144, 168, 170, 130, 132, 160, 162, and 148 operate under the conditions defined in Table 4 below.

TABLE 4

Normal Valve States

| STATE NAME | STATE LOGIC | 142 | 144 | 168 | 170 | 130 | 132 | 160 | 162 | 148 |
|---|---|---|---|---|---|---|---|---|---|---|
| C NL 0 0 | T01000000 | TRIM | — | 1 | 0 | 0 | 0 | 0 | 0 | 0 |
| C NL 1 − | T01100000 | TRIM | — | 1 | 1 | 0 | 0 | 0 | 0 | 0 |
| C NL 1 + | T01101000 | TRIM | — | 1 | 1 | 0 | 1 | 0 | 0 | 0 |
| C NH T FR | T01100010 | TRIM | — | 1 | 1 | 0 | 0 | 0 | 1 | 0 |
| C NH 2 + | T00100010 | TRIM | — | 0 | 1 | 0 | 0 | 0 | 1 | 0 |
| C NH 2 − | T00101010 | TRIM | — | 0 | 1 | 0 | 1 | 0 | 1 | 0 |
| H NL 0 0 | 0T1011000 | — | TRIM | 1 | 0 | 1 | 1 | 0 | 0 | 0 |
| H NL 1 − | 0T1111000 | — | TRIM | 1 | 1 | 1 | 1 | 0 | 0 | 0 |
| H NL 1 + | 0T1110000 | — | TRIM | 1 | 1 | 1 | 0 | 0 | 0 | 0 |
| H NH T FR | 0T1111010 | — | TRIM | 1 | 1 | 1 | 1 | 0 | 1 | 0 |
| H NH 2 + | 0T0111010 | — | TRIM | 0 | 1 | 1 | 1 | 0 | 1 | 0 |
| H NH 2 − | 0T0110010 | — | TRIM | 0 | 1 | 1 | 0 | 0 | 1 | 0 |

Figure 7:
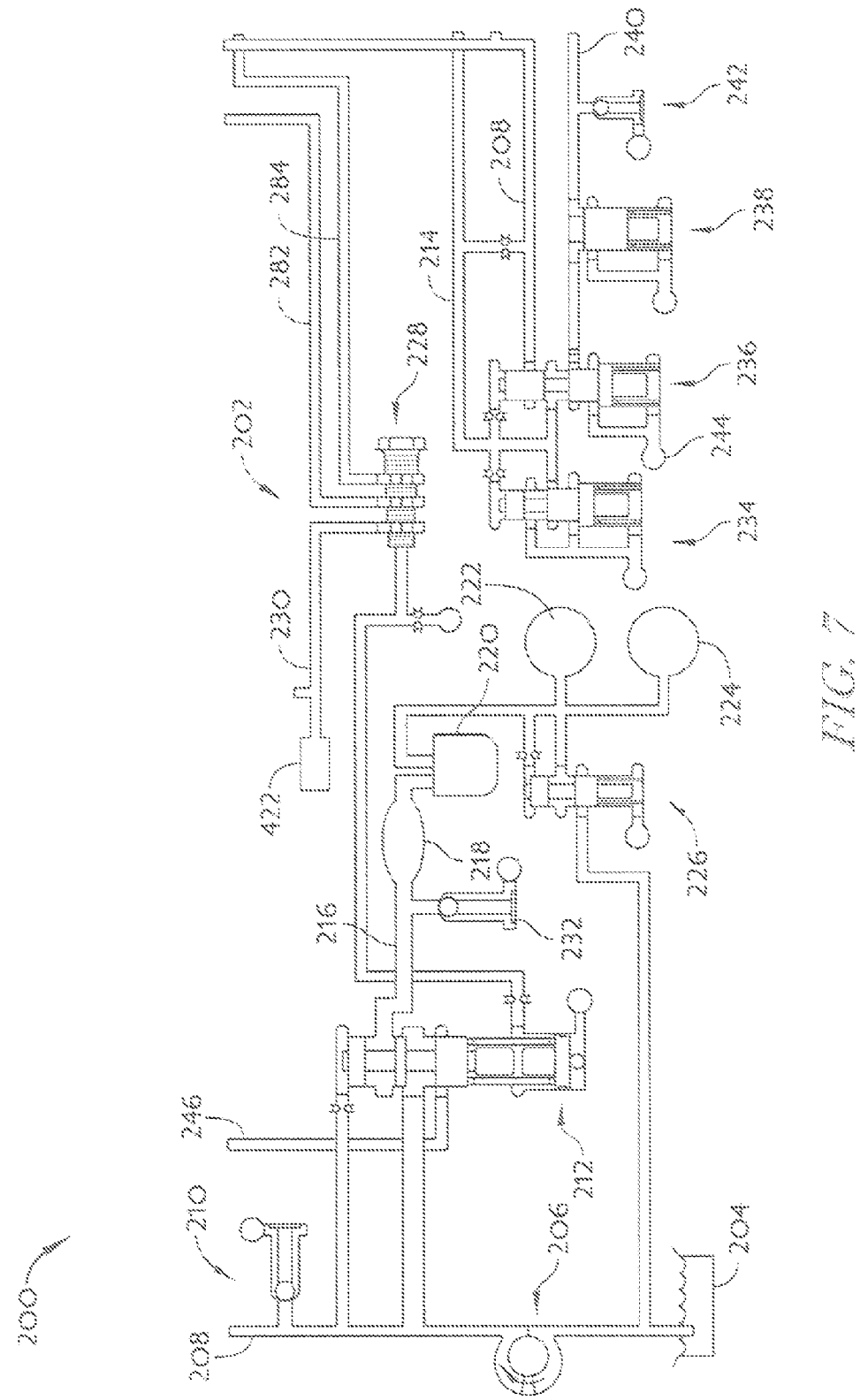
FIG. 7 is a schematic of a portion of the hydraulic circuit of the transmission including a main pump; lubrication sub-circuits; cooling, filtering, relief and regulation of the hydraulic circuit.

Referring now to FIGS. 7-11, the hydraulic circuit 200 of transmission 14 including components of the electro-hydraulic controller 16 is disclosed. FIGS. 7-11 depict the status of the hydraulic circuit 200 in the "H NL 0 0" state. FIG. 7 shows a pressure regulation and relief portion 202 of the hydraulic circuit 200. The hydraulic circuit 200 is fed from a sump 204 that holds unpressurized hydraulic fluid which is drawn from the sump 204 by a pump 206 which pressurizes the hydraulic fluid and feeds a main pressure line 208. As will be discussed in further detail, main pressure line 208 feeds both 168 and 170 each of which act on the main pressure line 208 to provide pressurized fluid to the variator logic section 124 and the mode logic section 150.

A main relief valve 210 is coupled to the main pressure line 208 and provides primary relief for the main pressure line 208 in over pressure conditions. The main pressure line 208 also feeds a main regulator 212 which regulates the pressure of the hydraulic fluid and feeds a pilot pressure to the variator trim valves 142 and 144 on a regulated line 246. The main regulator 212 also provides flow to a lubrication line 216 that includes a cooler 218 and a filter 220. The lubrication line 216 provides lubrication to the gears of the countershaft assembly 70 at gear lubrication 222 and to the variator 22 at variator lubrication 224. A lube regulator 226 receives hydraulic fluid from the lubrication line 216 and controls the flow of fluid to the gear lubrication 222 and variator lubrication 224. The cooler 218 cooperates with a cooler relief valve 232 so that the cooler relief valve 232 will prevent an over-pressure condition at the cooler 218.

Additional regulation and relief is provided by a main control relief valve 234 that cooperates with a control regulator 236 to provide a regulated pilot pressure in a pilot line 214 which provides a pilot pressure to assist in the actuation of the valves 142, 144, 168, 170, 130, 132, 160, 162, and 148. In addition, a clutch backfill regulator 238 maintains a proper back pressure on a mode backpressure line 240 with the mode backpressure line further including a relief valve 242. As a matter of convention, components in the electro-hydraulic controller 16 including valves and regulators have one or more exhaust ports 244. Those exhaust ports are designated with reference to an exhaust 244 which indicates that the ports 244 return to the sump 204, without pressurization.

A network shuttle 228 receives three inputs, a first mode logic input line 282, a second mode logic input line 284, and a variator pressure line 230. The network shuttle 228 compares the pressures on each of the three inputs and transfers the highest pressure input to the main regulator 212. In state H NL 0 0, the second mode logic input line 284 and the variator pressure line 230 have lower pressures than the first mode logic input line 282 so that the first mode logic input line 282 is fed to the main regulator 212 to regulate the pressure on the main pressure line 208. In other states, second mode logic input line 284 or the variator pressure line 230 have the highest pressure and control the main regulator 212 and thereby control regulation of the main pressure line 208.

Figure 9:
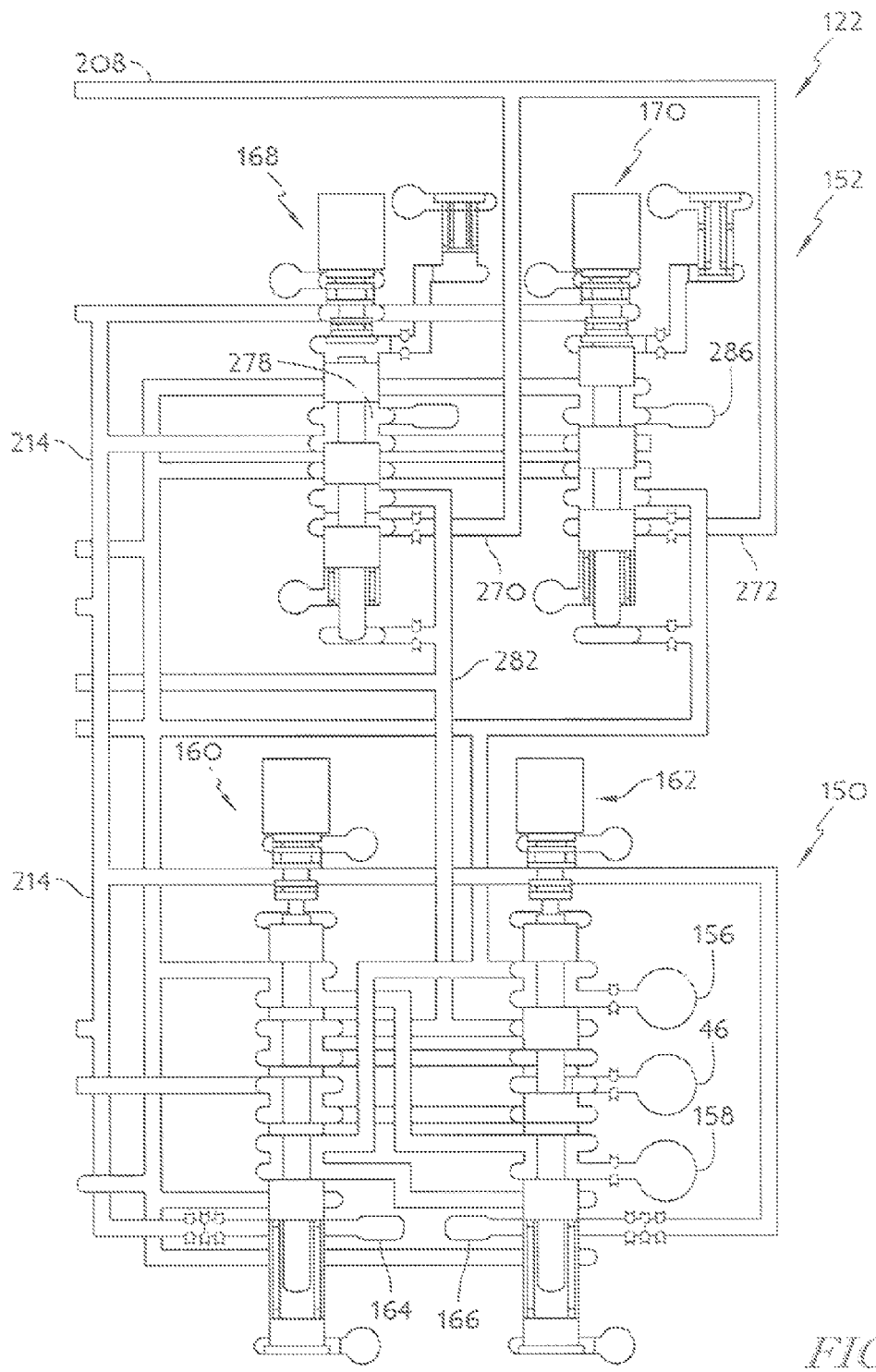
FIG. 9 is a schematic of the mode control portion of the hydraulic circuit of the transmission showing a first mode trim valve in an active state.

Referring now to FIG. 9, the mode trim control 152 is coupled to the main pressure line 208 with a port 270 of the first mode trim valve 168 and a port 272 of the second mode trim valve 170 each coupled to main pressure line 208. The first mode trim valve 168 is on when the state is H NL 0 0. In this state, the pilot line 214 is in communication with a pressure sensor 278 associated with the first mode trim valve 168. The pressure applied to pressure sensor 278 is sufficient to activate pressure sensor 278 to a value of 1, confirming the condition of the first mode trim valve 168 as stroked. When first mode trim valve 168 is stroked, the first mode logic input line 282 is pressurized. The first mode logic input line 282 also communicates with the network shuttle 228 as described above. The pilot line 214 communicates to both the first mode trim valve 168 and the second mode trim valve 170. There is no flow of pressurized hydraulic fluid through 170 in H NL 0 0 and a second mode logic input line 284 since the second mode trim valve 170 is de-stroked.

In the mode logic section 150 the first mode logic input line 282 under the H NL 0 0 state is in communication with first mode logic valve 160. When deactivated, the first mode logic valve 160 communicates the first mode logic input line 282 to a portion of the second mode logic valve 162 which is in communication with input clutch 46 so that the input clutch 46 is stroked and active. However, neither the first mode clutch 156 nor the second mode clutch 158 are stroked, so there is no motion transferred through countershaft assembly 70.

Referring now to FIGS. 10 and 11, the hydraulic circuit associated with the operation of the variator 22 is shown to include the endload chamber 66 that operates with an endload relief valve 350 which is fed from the variator control 120 by a variator control line 352 that is connected to a port 354. The endload relief valve 350 pressurizes the endload chamber 66 but since the transmission 14 is in the H NL 0 0 state, there is no flow or pressurization of hydraulic fluid to the cylinders 184a, 184b, 184c, 186a, 186b, and 186c. In the H NL 0 0 state, the countershaft assembly 70 does not receive rotation from the output 38 of the variator 22, so the variator 22 experiences no torque.

Figure 8:
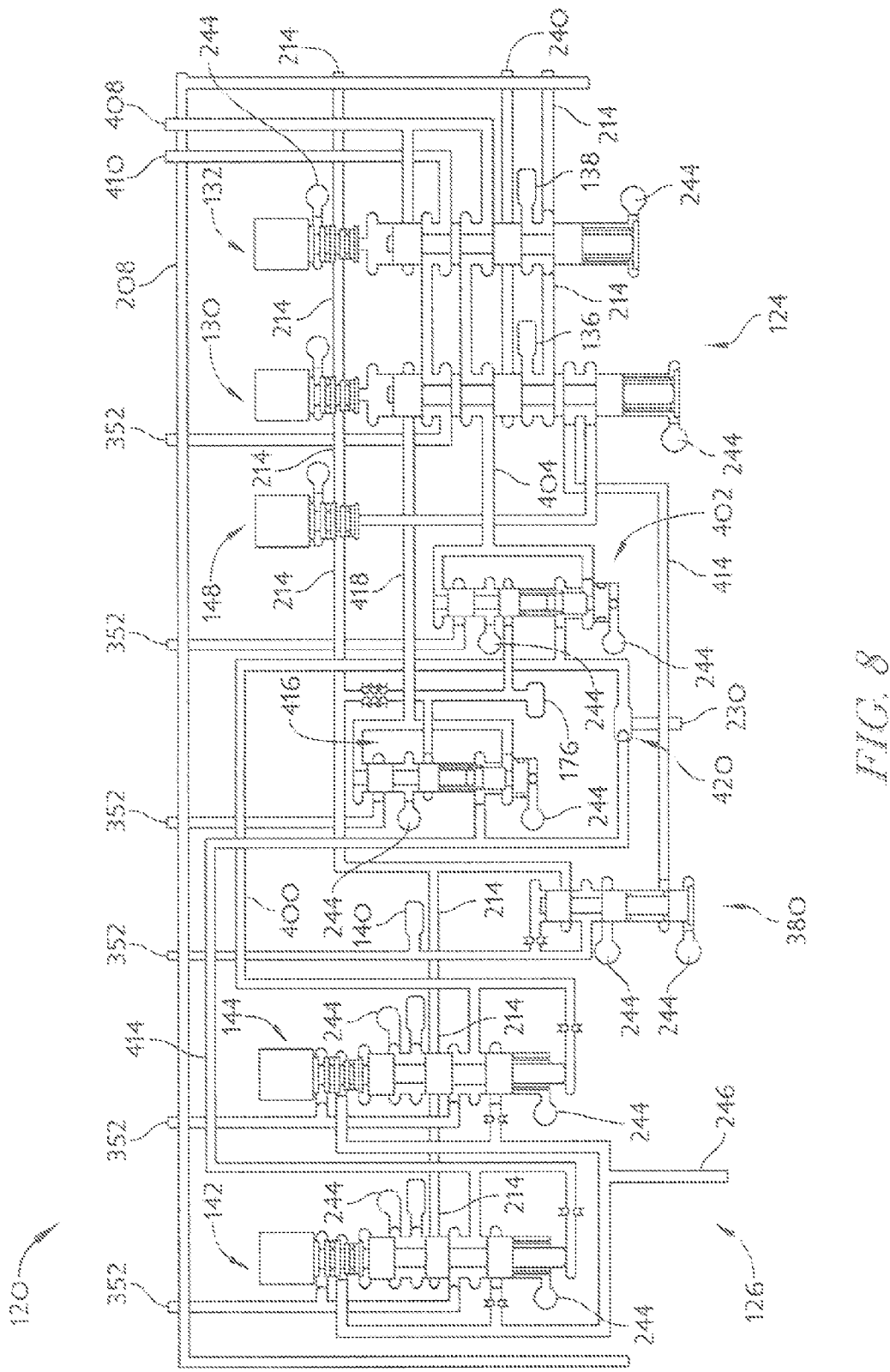
FIG. 8 is a schematic of the variator control portion of the hydraulic circuit of the transmission.

The hydraulic schematic associated with the variator control 120 is shown in FIG. 8 where the pilot line 214 is in communication with each of the valves 130, 132, 148, 142, and 144. In the H NL 0 0 state, the pilot line 214 is in communication with the pressure sensors 136 and 138 so that the pressure on pilot line 214 is applied to the pressure sensors 136 and 138 to cause the state of the pressure sensors 136 and 138 to be read as stroked or "1" by the processor 72. This allows the electro-hydraulic controller 16 to confirm that the variator logic valves 130 and 132 are in their proper state, which prevents pressure from being applied to the variator cylinders 184a, 184b, 184c, 186a, 186b, and 186c.

Figure 12:
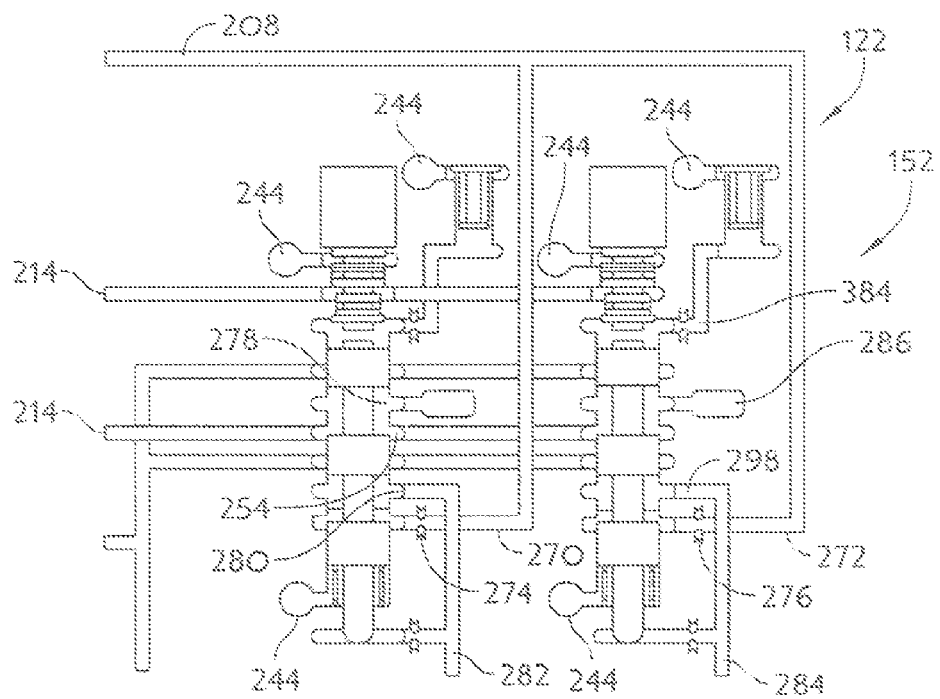
FIG. 12 is a schematic of the mode trim control section of the mode control portion of the hydraulic circuit of the transmission showing both mode trim valves in an active state.
Figure 13:
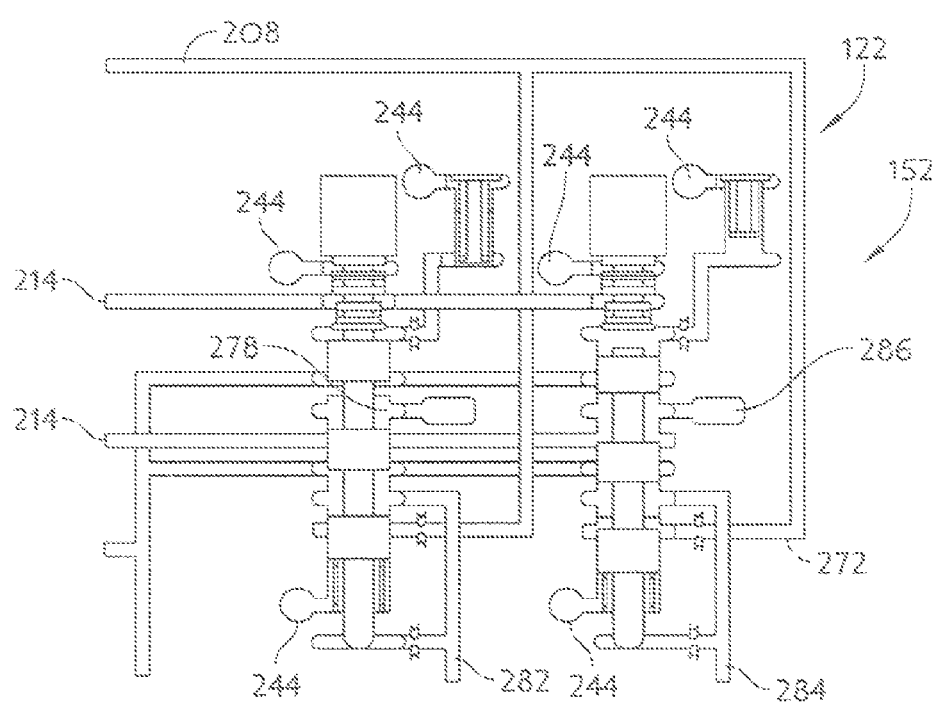
FIG. 13 is a schematic of the mode trim control section of the mode control portion of the hydraulic circuit of the transmission showing a second mode trim valve in an active state.

Referring now to FIGS. 12 and 13, the other states of the mode trim valves 168 and 170 are shown. When the second mode trim valve 170 is stroked, the pressure from pilot line 214 is sensed by the pressure sensor 286 and pressurized hydraulic fluid is communicated through the second mode logic input line 284. The pressure is varied to control the pressure to the second mode logic input line 284. Thus, under normal operating conditions activation of the second mode trim valve 170 will result in an active signal from pressure sensor 286.

As shown in FIG. 13, when the first mode trim valve 168 is deactivated, the pressure of pilot line 214 is not sensed by the pressure sensor 278. Similarly, the flow to first mode logic input line 282 is turned off so that there is no pressurized hydraulic fluid transferred to first mode logic input line 282.

Figure 16:
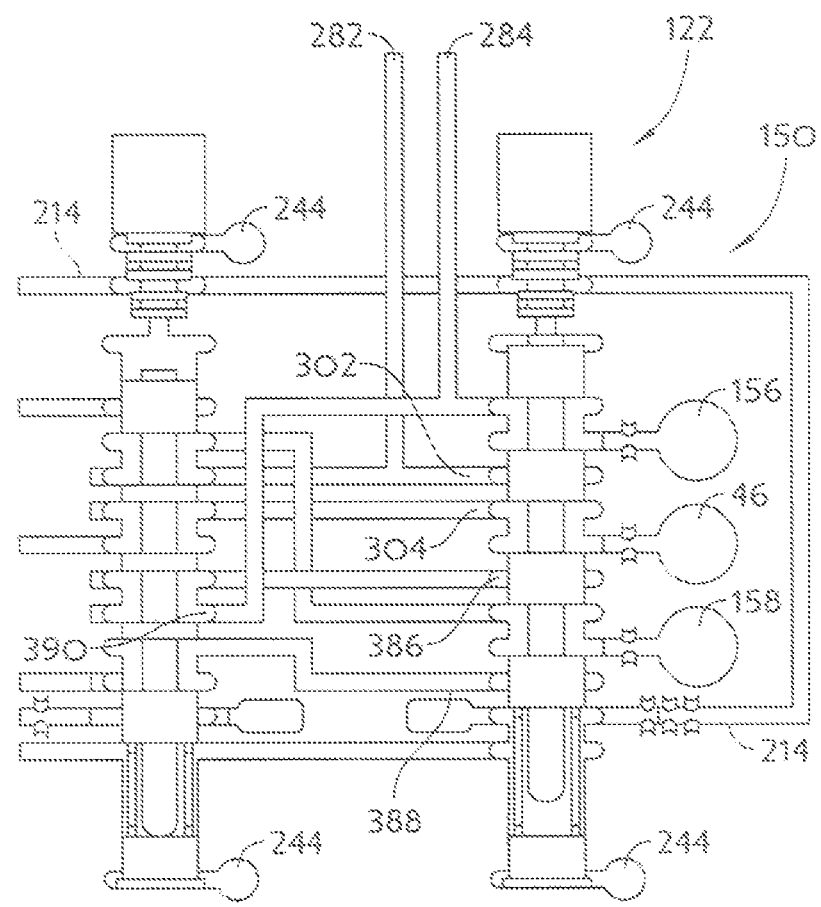
FIG. 16 is a schematic of the mode logic control section of the mode control portion of the hydraulic circuit of the transmission showing a first mode logic valve in an active state.

Referring now to FIGS. 14-16, the additional flow paths that are experienced by the mode logic section 150 are depicted. Each of the first and second mode logic valves 160 and 162 are de-stroked in FIG. 9. In FIG. 14, the second mode logic valve 162 is stroked so that the first mode logic input line 282 energizes the first mode clutch 156 through the port 302 on the second mode logic valve 162, while the input clutch 46 is stroked by the main pressure line 208 through a port 386 on second mode logic valve 162. The second mode clutch 158 is stroked from the second mode logic input line 284 through port 390 on the first mode logic valve 160 which feeds a port 392 which subsequently feeds a port 388 on the second mode logic valve 162. The movement of the second mode logic valve 162 permits the pilot line 214 to communicate with the pressure sensor 166 so that the processor 72 can confirm that the second mode logic valve 162 is operating correctly.

As shown in FIG. 15, when both mode logic valves 160 and 162 are stroked, the first mode clutch 156 is in communication with the first mode logic input line 282 and the input clutch 46 is in communication with the main pressure in line 408 and the input clutch 46 is active as there is no flow to the second mode clutch 158. The input clutch 46 is activated from the main pressure line 208. Because the movement of the first mode logic valve 160 permits the pilot line 214 to communicate to pressure sensor 164, the processor 72 can confirm that the first mode logic valve 162 is operating correctly.

As shown in FIG. 16, when the first mode logic valve 160 is stroked and the second mode logic valve 162 is de-stroked, the first mode clutch 156 is in communication with second mode logic input line 284 and second mode clutch 158 is in fluid communication with first mode logic input line 282. As will be discussed in more detail below, the use of the mode trim valves 168 and 170 with the mode logic valves 160 and 162 allows the electro-hydraulic controller 16 to compensate for single fault failures of components in the mode control 122 without any loss of functionality of the transmission 14.

Referring again now to FIG. 8, the operation of the variator control 120 may best be understood by the inputs to the variator control 120 and the outputs therefrom. It should be understood that the pilot line 214 is in communication with every component of the variator control 120. Beyond that, the basic input to the variator control is the regulated line 246 which is fed from the main regulator 212. Under normal operation, the second variator trim valve 144 utilizes the regulated line 246 as a source of pressurized fluid and, responsive to a voltage signal from the control circuit 76 and under the operation of the processor 72, controls the pressure applied to the cylinders 184a, 184b, 184c, 186a, 186b, and 186c of the variator 22. The pressure controlled hydraulic fluid is transmitted to the variator logic section 124 through a control line 400 which feeds a damper 402 that provides the damped fluid flow through a first variator logic input line 404. When both of the variator logic valves 130 and 132 are stroked, the first variator logic input line 404 is in communication with a variator control line 408 which feeds the negative torque side 412 of the variator cylinders 184a, 184b, 184c, 186a, 186b, and 186c.

In some cases, when the transmission 14 is in cold mode, the first variator trim valve 142 is active and the second variator trim valve 144 is inactive. When the first variator trim valve 142 is active, the first variator trim valve 142 utilizes the regulated line 246 as a source of pressurized fluid and, responsive to a voltage signal from the control circuit 76 and under the operation of the processor 72, controls the pressure applied to the cylinders 184a, 184b, 184c, 186a, 186b, and 186c of the variator 22. The controlled pressure hydraulic fluid is transmitted to the variator logic section 124 through a control line 418 which feeds a damper 416 that provides the damped fluid flow through a second variator logic input line 418. When both of the variator logic valves 130 and 132 are stroked, as shown in FIG. 8, the second variator logic input line 418 has no flow path. Thus, it is necessary that the state of the variator logic valves 130 and 132 be changed in cold operation. The first variator trim valve 142 operates at a pressure that is higher than the second variator trim valve 144 to compensate for the higher viscosity of the fluid used in the variator 22.

A variator shuttle 420 is operable to change the flow path from the variator pressure line 230 between the control line 418 and the control line 400. The variator pressure line 230 is in communication with the network shuttle 228 and a transducer 422. The transducer 422 is in communication with the processor 72 and is operable to provide a signal indicative of the pressure in the respective control line 418 or 400 to provide feedback to the processor 72 for control of the first and second variator trim valves 142 and 144. The first and second variator trim valves 142 and 144 apply the appropriate pressure to the cylinders 184a, 184b, 184c, 186a, 186b, and 186c based on the pressure in the respective control line 418 or 400. For example, a sudden change in pressure as sensed by the transducer 422 is indicative of a change in load on the output 38 of the variator 22, which signals the processor 72 of the electro-hydraulic controller 16 to modify the pressure applied or switch between pressurization of the first and second sides of the cylinders 184a, 184b, 184c, 186a, 186b, and 186c.

Effectively, the variator logic section 124 switches the direction of pressure applied to the cylinders 184a, 184b, 184c, 186a, 186b, and 186c by switching between applying pressure to the variator control 408 and another variator control line 410. The reversal of the direction of the pressure applied between the positive torque side 356 and the negative torque side 412 permits the cylinders 184a, 184b, 184c, 186a, 186b, and 186c to precesses to an equilibrium position. A pair of check valves 430 and 432 cooperate to prevent improper flow of hydraulic fluid to the endload chamber 66. The check valves 430 and 432 act to allow the pressurized control line, either control line 408 or 410, to apply pressure to the endload chamber 66 while the load is applied to the cylinders 184a, 184b, 184c, 186a, 186b, and 186c by overcoming the pressure limit of the respective check valve 430 or 432. Simultaneously, the opposite check valve 432 or 430 prevents flow through the valve 430 or 432 in the wrong direction. An endload shuttle 434 prevents improper flow on the return side of the cylinders 184a, 184b, 184c, 186a, 186b, and 186c. For example, if the pressure in the control line 408 is higher than the pressure in the control line 410, the check valve 430 will crack permitting the pressure to be applied to the endload chamber 66 and the endload relief 350. The endload shuttle 434 shifts to the positive torque side 356 to prevent flow from the positive torque side 356 to the endload chamber 66.

Figure 19:
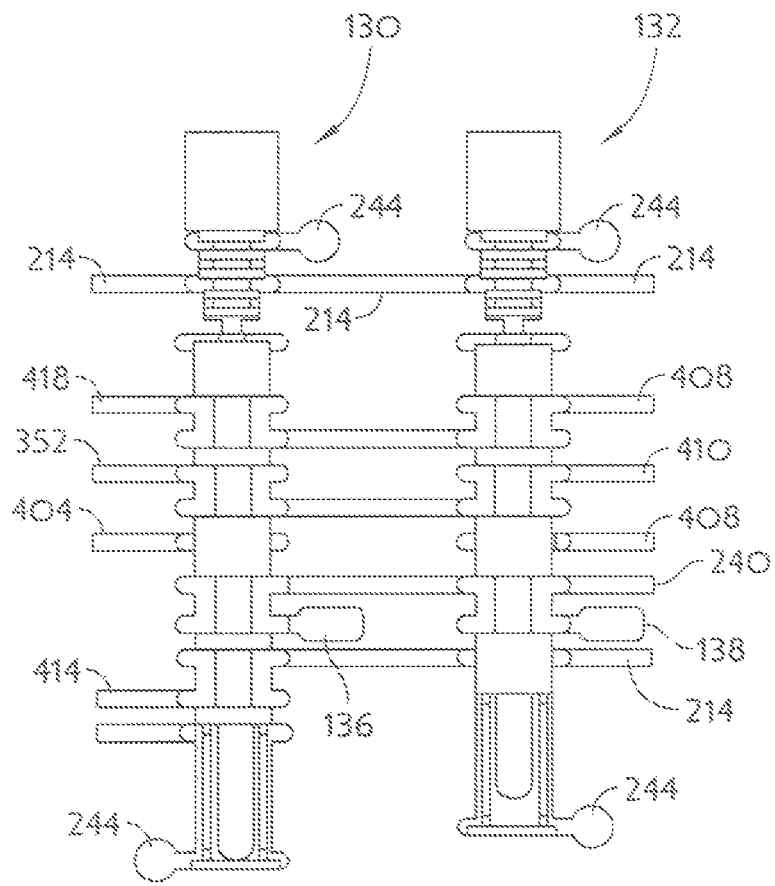
FIG. 19 is a schematic of the variator logic control section of the variator control portion of the hydraulic circuit of the transmission showing both the first variator logic valve and the second variator logic valve in a de-stroked state.

Referring now to FIGS. 17-19, the various logical results of the different states of the variator logic valves 130 and 132 are disclosed. When the first variator logic valve 130 is stroked and the second variator logic valve 132 is de-stroked, the first variator logic input line 404 is in communication with the variator control line 410. This arrangement of the first and second variator logic valves 130, 132 pressurizes the positive torque side 356 of the cylinders 184a, 184b, 184c, 186a, 186b, and 186c and the second variator logic input line 418 has no flow. The variator control line 352 is in communication with the variator control line 408 that pressurizes the negative torque side 412 as shown in FIG. 17. When the first variator logic valve 130 is de-stroked and the second variator logic valve 132 is stroked, line 418 communicates with line 410 and line 352 communicates with line 408 as shown in FIG. 18. When both valves 130 and 132 are de-stroked line 418 communicates with line 408 and line 404 does not have a flow path. The variator control line 352 communicates with line 410 as shown in FIG. 19. Thus, a failure of either of the variator logic valves 130 or 132 can be resolved with the redundant use of the second of the variator logic valves 130 or 132.

Figure 6:
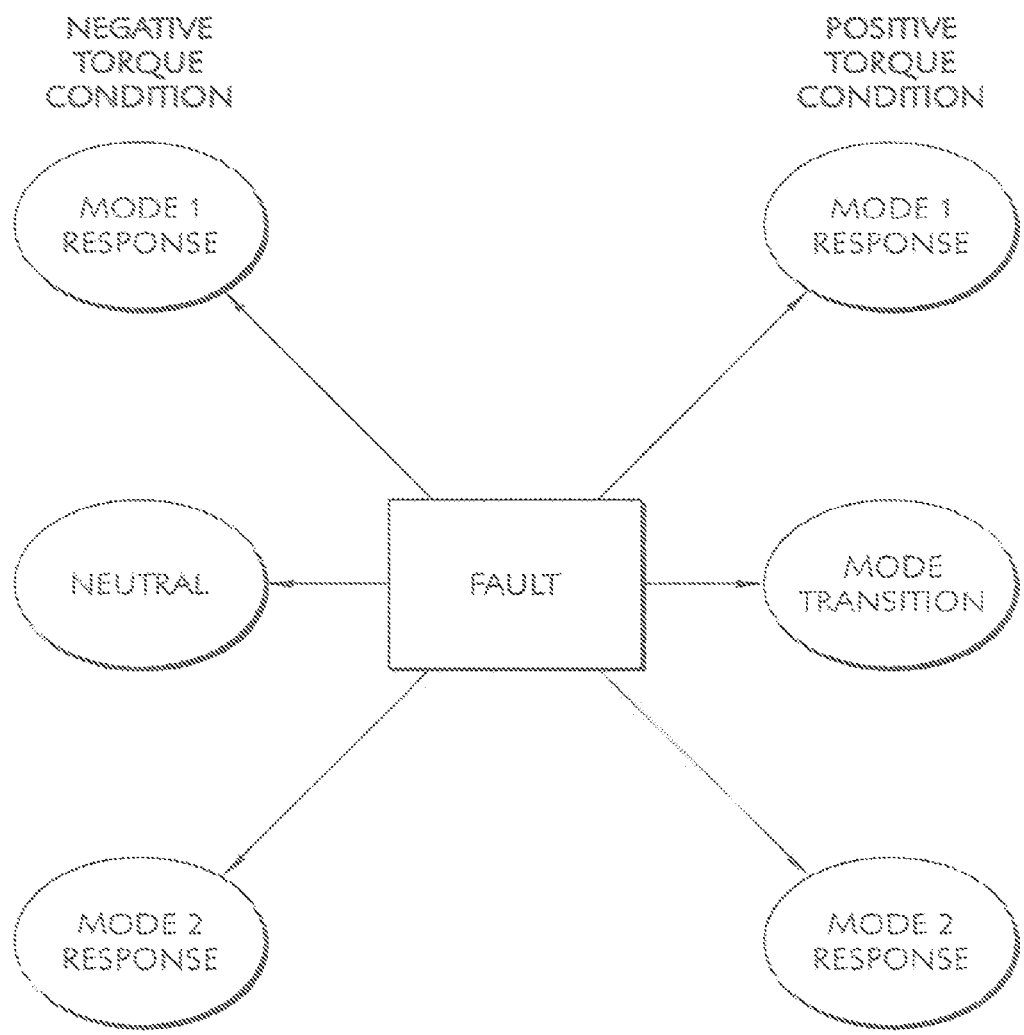
FIG. 6 is a state diagram showing possible states of the electro-hydraulic controller when a single fault is experienced in the electro-hydraulic controller.

In operation, the transmission 14 has three distinct operating modes: mode 1 is a low speed IVT mode when the transmission 14 operates between 10 miles per hour in reverse and 10 miles per hour in forward with a geared neutral; mode 2 is a high speed forward CVT mode for speeds in excess of 10 miles per hour, mode 3 is a transition mode providing for a transition between the IVT (mode 1) and CVT (mode 2). Referring to FIG. 6, the present implementation provides for six potential responses to a single fault failure of a component of the electro-hydraulic controller 16. Depending on the direction of torque, the responses must maintain full functionality of the transmission 14 in spite of the fault. By comparing the expected states of the pressure sensors 136, 138, 164, 166, 140, 278, 286, 146, 148, and 176 to the actual states, faults are detected in the electro-hydraulic controller 16. Redundancy in the hardware permits the functionality of the transmission 14 by altering the fluid flow path using other components in the electro-hydraulic controller 16 to compensate for the fault.

Referring to FIG. 23, a table shows the potential fault states of various components of the electro-hydraulic controller 16 in the first column. Across the top of the table are the normal states that the transmission 14 may experience under normal, hot, operating conditions. Each response of the electro-hydraulic controller 16 that resolves the single faults listed in the first column are shown in the table, where a response is necessary. When the transmission 14 is operating in a cold mode and experiences faults, the fault response is as shown in the table of FIG. 24.

The ability of the electro-hydraulic controller 16 to respond to single point failure modes without loss of functionality is a significant improvement over the prior art systems that fail to neutral or fail to a particular mode allowing the vehicle 8 to "limp" home. The redundancy of the electro-hydraulic controller 16 that results from the interaction of the variator control 120 and the mode control 122, permits components, such as valves, that are dedicated to a specific purpose to be used to resolve failures in other areas of the transmission 14, without loss of functionality.

Figure 20:
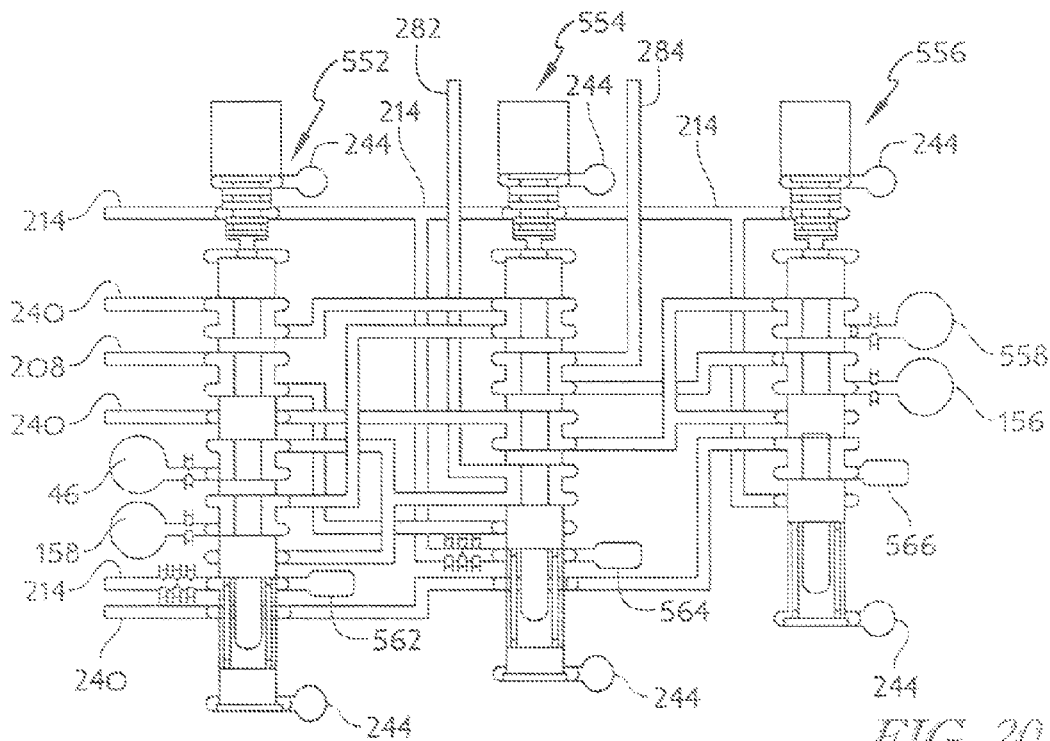
FIG. 20 is a schematic of another embodiment of a mode logic control section of the mode control portion of the hydraulic circuit of the transmission showing both three mode logic valves with none of the three valves in a stroked state.
Figure 21:
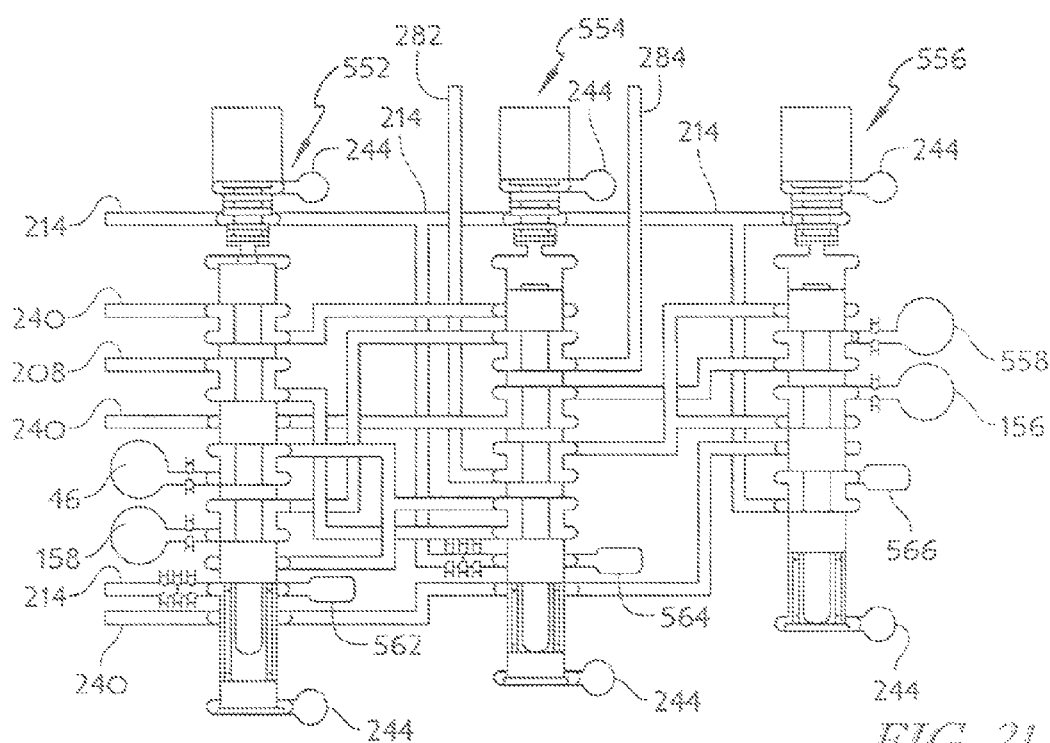
FIG. 21 is a schematic of another embodiment of a mode logic control section of the mode control portion of the hydraulic circuit of the transmission showing both three mode logic valves with the second and third of the three valves in a stroked state.

In a second embodiment, shown in FIGS. 20-21, an electro-hydraulic controller 516 of a transmission 514 is similar to electro-hydraulic controller 16, with mode logic section 150 omitted and replaced with a mode logic section 550 having three mode logic valves 552, 554, and 556. The mode logic section 550 controls the input clutch 46, a first mode clutch 156, a second mode clutch 158, and a third mode clutch 558. The countershaft assembly 570 of the transmission 514 includes a third mode to increase the range of the transmission 514. This requires that the mode logic section 550 provide sufficient logic to vary the operation of the clutches 46, 156, 158, and 558 to achieve all three modes of transmission 514 as well as the transition between modes. In all other respects, the transmission 514 is similar to transmission 14 and like reference designators will be used where appropriate.

The first mode logic input line 282 and the second mode logic input line 284 each feed the second mode logic valve 554 of the mode logic section 550. Each of those lines 282 and 284 may be pressurized independently, providing four different states for the mode logic section 550. As noted in Table 5 below, there are eight distinct modes used to operate the clutches 46, 156, 158, and 558 to achieve the desired clutch states to operate the transmission 514. The remaining normal states are controlled by changing the states of the valves 552, 554, and 556 as described in the Table 5 below.

TABLE 5

Three Mode Clutch Control Normal States

| Input States | | | | | Clutch States | | | |
|---|---|---|---|---|---|---|---|---|
| Input Line 282 | Input Line 284 | Valve 552 | Valve 554 | Valve 556 | Input Clutch | Mode 1 | Mode 2 | Mode 3 |
| 0 | 0 | 0 | 0 | 0 | 0 | 0 | 0 | 0 |
| 1 | 0 | 0 | 0 | 0 | 1 | 0 | 0 | 0 |
| 0 | 0 | 0 | 1 | 1 | 1 | 0 | 0 | 0 |
| 1 | 0 | 0 | 1 | 1 | 1 | 1 | 0 | 0 |
| 1 | 1 | 0 | 1 | 1 | 1 | 1 | 1 | 0 |
| 0 | 1 | 0 | 1 | 1 | 1 | 0 | 1 | 1 |
| 1 | 1 | 0 | 1 | 0 | 11 | 0 | 1 | 1 |
| 1 | 0 | 0 | 1 | 0 | 1 | 0 | 0 | 1 |

FIG. 20 shows the first state of the logic valves 552, 554, and 556 where each is de-stroked. When the first logic mode input line 282 is pressurized, the input clutch 46 is stroked. Under some operating conditions, the input clutch 46 may also be stroked when the second logic valve 554 is stroked, with the input clutch 46 being placed in fluid communication with main pressure line 208 as shown in FIG. 21.

Also, as shown in FIG. 20, when all of the logic valves 552, 554, and 556 are de-stroked, the first mode clutch 156 is in communication with the second mode logic input line 284 such that when the second mode logic input line 284 is pressurized, the pressure is transferred to the first mode clutch 156 to activate the first mode clutch 156.

In FIG. 21, both logic valves 554 and 556 are stroked so that the second mode clutch 158 is in communication with second mode logic input line 284 and is stroked when second mode logic input line 284 is pressurized. The first mode clutch 552 is in communication with first mode logic input line 282 so that pressurization of the first mode logic input line 282 energizes the first mode clutch 552. In this condition, the input clutch 46 is put in communication with the main line 208 which activates the input clutch 46.

Figure 22:
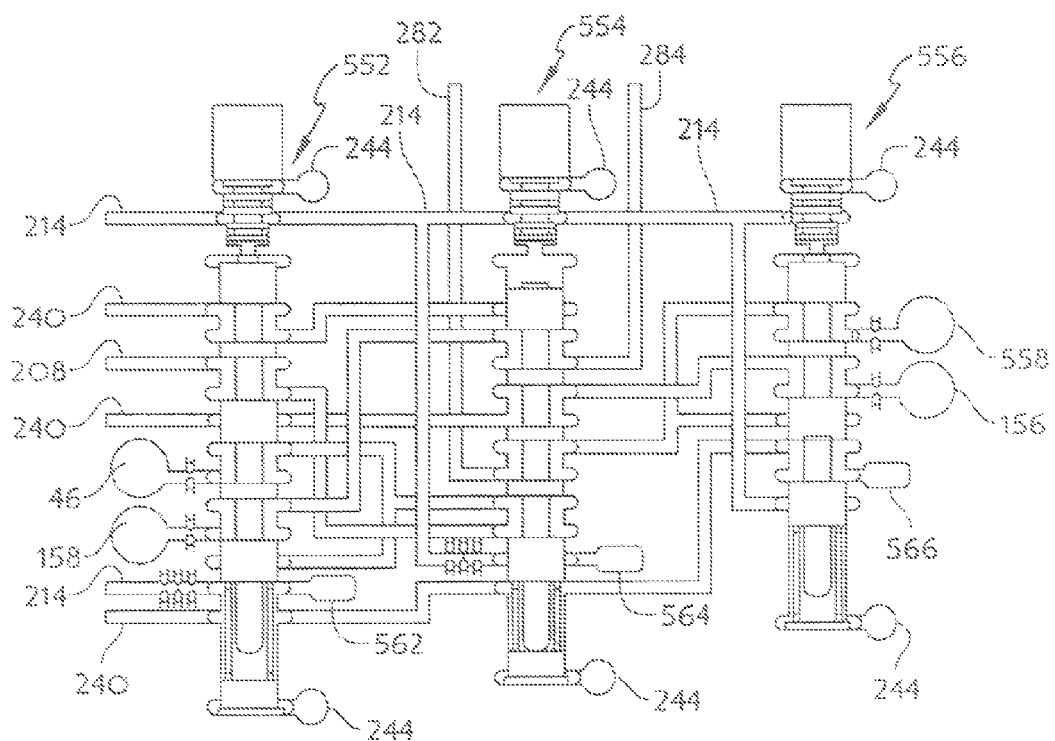
FIG. 22 is a schematic of another embodiment of a mode logic control section of the mode control portion of the hydraulic circuit of the transmission showing both three mode logic valves with the second of the three valves in a stroked state.
Figure 28:
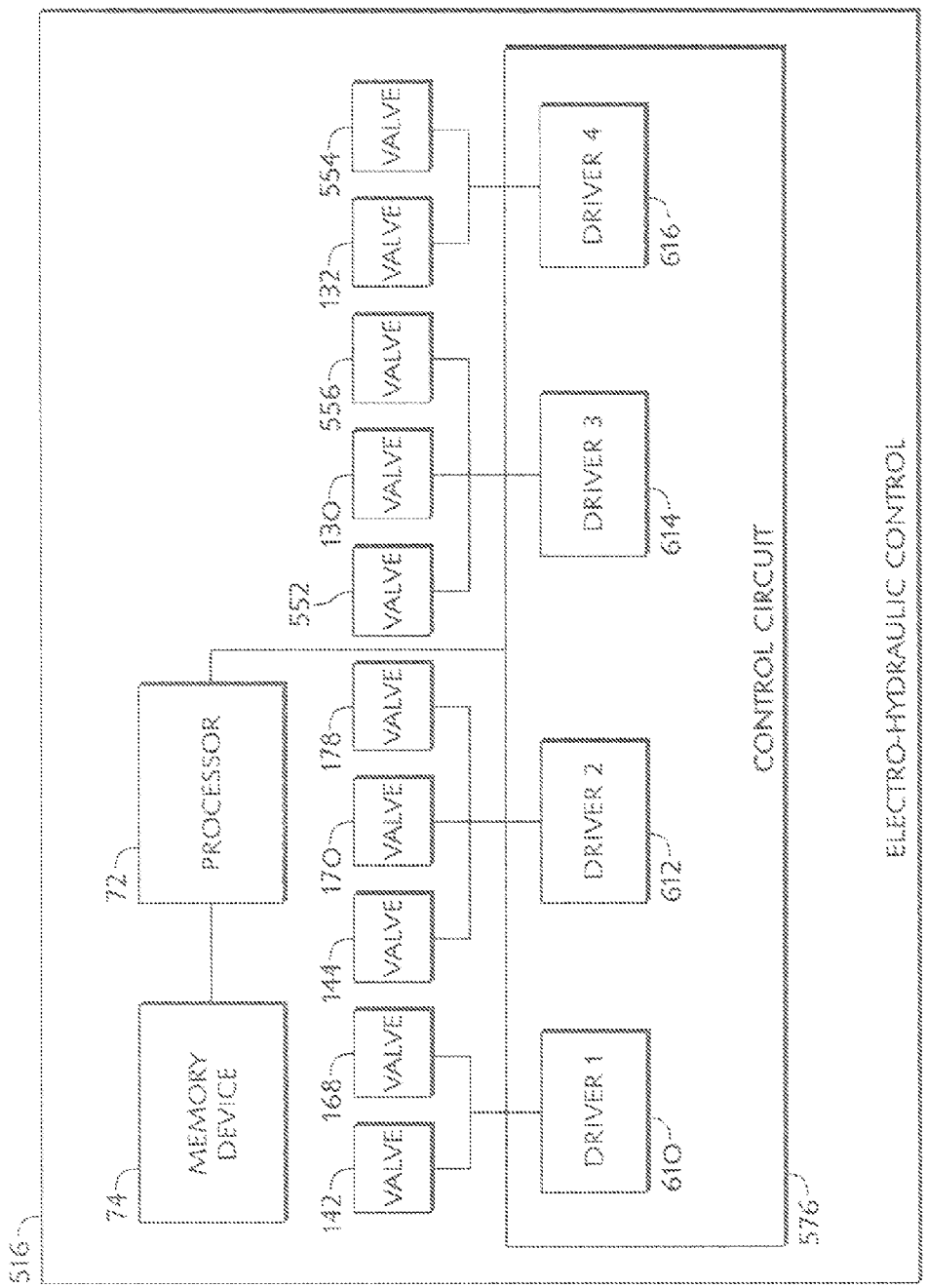
FIG. 28 is a diagrammatic representation of a portion of the control circuit of the second embodiment of transmission.

Finally, as shown in FIG. 22, only the second logic valve 554 is stroked so that the second mode clutch 158 maintains communication with the second mode logic input line 284 and is stroked when the second mode logic input line 284 is pressurized. The input clutch 46 maintains communication with the main line 208 and the third mode clutch 558 is placed in communication with the first mode logic input line 282 and is stroked when the line 282 is pressurized.

Each of the mode logic valves 552, 554, and 556 have a respective pressure sensor 562, 564, 566 that is operable to detect when an associated valve is stroked by sensing the pressure of the pilot line 214. As described above with regard to the pressure sensors 136, 138, 164, 166, 140, 278, 286, 146, 148, and 176, the pressure sensors 562, 564, 566 are illustratively pressure switches, but could be pressure transducers in other embodiments.

A control circuit 576 includes a first driver 610 powering the first variator trim valve 142 and the first mode trim valve 168; a second driver 612 powering the second variator trim valve 144 and the second mode trim valve 170, as well as the boost valve 178; a third driver 614 powering the first mode logic valve 552, the first variator logic valve 130, and the third mode logic valve 556; and a fourth driver 616 powering the second variator logic valve 132 and the second mode logic valve 554. The drivers 610, 612, 614 and 616 are each potential failure points that are addressed in the tables shown in FIGS. 25 and 26.

In mode 1, the transmission 514 operates as an infinitely variable transmission from reverse, through neutral, up to forward speeds of about 20 miles per hour. In mode 2, the transmission 514 operates as a continuously variable transmission from speeds of about 20 miles per hour to about 45 miles per hour. In mode 3, the transmission 514 operates as a continuously variable transmission with speed of 45 miles per hour and above.

Because of the redundancy of the mode logic valves 552, 554, and 556, the transmission 514 is single fault tolerant with alternate modes of operation similar to those described above with regard to transmission 14. The state name convention for the second embodiment has three aspects including a variator state, a clutch state, and a servo state. Table 6 shows the key for the first aspect, the variator state.

TABLE 6

| Variator State Codes | |
|---|---|
| CODE | DESCRIPTION |
| C | Normal Cold |
| H | Normal Hot |
| AC | Alternate Cold |
| F | Variator Logic Valve 132 Fault |

Table 7 shows the key for the second aspect, the clutch state.

TABLE 7

| Clutch State Codes | | |
|---|---|---|
| Code | Description | Active Clutches |
| NN | Normal Neutral | None |
| NTS | Normal Start | 46 |
| N0 | Normal Mode 0 | 46 |
| N1 | Normal Mode 1 | 46, 156 |
| N12 | Normal 1-2 Transition | 46, 156, 158 |
| N2 | Normal Mode 2 | 46, 158 |
| N23 | Normal 2-3 Transition | 46, 158, 558 |
| N3 | Normal Mode 3 | 46, 558 |
| AN | Alternate Neutral | None |
| ATS | Alternate Start | 46 |
| A0 | Alternate Mode 0 | 46 |
| A1 | Alternate Mode 1 | 46, 156 |
| A12 | Alternate 1-2 Transition | 46, 156, 158 |
| A2 | Alternate Mode 2 | 46, 158 |
| A23 | Alternate 2-3 Transition | 46, 158, 558 |
| A3 | Alternate Mode 3 | 46, 558 |
| F3L | Fault Valve 168 Low | 46, 156 |
| F4L | Fault Valve 170 Low | 46, 156 |

Table 8 shows the key for the third aspect, the side of the cylinders 184a, 184b, 184c, 186a, 186b, and 186c which are pressurized.

TABLE 8

| Servo State Codes | |
|---|---|
| Code | Direction |
| 0 | None |
| S1 | Negative Torque Side 412 |
| S2 | Positive Torque Side 356 |

Referring now to FIGS. 25 and 26, the response for specific single fault failures of components of the electro-hydraulic controller 16 in the second embodiment are shown. The failure mode is shown in the first column Expected states are shown across the top of the remaining columns with the response state shown in the table. Where blanks are shown in the table, there is no response required as the single fault failure does not have an impact on the operation of the electro-hydraulic controller 16.

Although certain illustrative embodiments have been described in detail above, variations and modifications exist within the scope and spirit of this disclosure as described and as defined in the following claims.

The invention claimed is:

1. A transmission comprising
a variator including an input and an output,
a countershaft assembly operatively coupled to the output of the variator,
an electro-hydraulic controller including a variator trim section, a variator logic section, a plurality of double-acting cylinders for varying the ratio through the variator, and a transducer for measuring a pressure in a hydraulic fluid path from the variator trim section to the variator logic section, the variator trim section including a first variator trim valve assembly operable to control the pressure of the hydraulic fluid path under a first operating condition and a second variator trim valve assembly operable to control the pressure of the hydraulic fluid path under a second operating condition, the variator logic section including a first variator logic valve assembly and a second variator logic valve assembly, the first and second logic valve assemblies cooperate to define a first hydraulic fluid path under the first operating condition and a second hydraulic fluid path under the second operating condition.

2. The transmission of claim 1, wherein the first variator logic valve assembly maintains a constant position during the first operating condition of the transmission.

3. The transmission of claim 2, wherein the second variator logic valve assembly maintains a constant position during the second operating condition of the transmission.

4. The transmission of claim 3, wherein the first variator logic valve assembly moves between a first position and a second position during the second operating condition of the transmission to vary the fluid flow path between a first side and a second side of the double-acting hydraulic cylinders.

5. The transmission of claim 3, wherein the second variator logic valve assembly moves between a first position and a second position during the first operating condition of the transmission to vary the fluid flow path between a first side and a second side of the double-acting hydraulic cylinders.

6. The transmission of 3, wherein the first operating condition is a normal temperature condition and the second operating condition is a cold temperature condition.

7. The transmission of claim 6, wherein the second variator trim valve assembly provides hydraulic fluid at a higher pressure than the first variator trim valve to provide a higher pressure to the variator during the second operating condition.

8. The transmission of claim 7, wherein the variator logic section includes a third variator logic valve assembly that is moveable between a first position and a second position wherein the third variator logic valve assembly defines a hydraulic fluid path that boosts the pressure applied by the first variator trim valve in the second operating condition in the event the second variator trim valve fails.

9. The transmission of claim 7, wherein the torque applied by the variator is limited in the second operating condition.

10. An electro-hydraulic controller for a transmission including a variator having an output, the electro-hydraulic controller comprising
a variator trim section including a plurality of variator trim valve assemblies each operable to control the pressure in a hydraulic fluid supplied to the variator, the plurality of variator trim valve assemblies having a normal mode variator trim valve assembly and a cold mode variator trim valve assembly, the normal mode variator trim assembly operable to control the hydraulic fluid pressure supplied to the variator under normal operating conditions in which the cold mode variator trim valve assembly is inactive, the cold mode variator trim assembly operable to control the hydraulic fluid pressure supplied to the variator under cold operating conditions in which the normal mode variator trim assembly is inactive,
a variator logic section including a plurality of variator logic valve assemblies each movable between a plurality of positions to define a flow path for the hydraulic fluid to the variator,
a plurality of pressure switches,
a transducer,
a plurality of speed sensors operable to measure the speed of various components of the transmission
a processor operatively coupled to the variator trim valve assemblies, the variator logic valve assemblies, the plurality of pressure switches, the transducer and the speed sensors, and
a memory device including instructions that, when executed by the processor, cause the processor to control the variator trim valve assemblies and variator logic valve assemblies in response to signals received from the pressure switches, the transducer, and speed sensors to control the ratio of the variator.

11. The electro-hydraulic controller of claim 10, wherein the cold mode variator trim valve assembly develops a pressure in the hydraulic fluid that is substantially higher than the normal mode variator trim valve assembly.

12. The electro-hydraulic controller of claim 11, wherein the memory device includes further instructions that, when executed by the processor, define a first fluid path when the normal mode variator trim valve assembly is active and a second fluid path when the cold mode variator trim valve assembly is active.

13. The electro-hydraulic controller of claim 12, wherein the memory device includes further instructions that, when executed by the processor, define a third fluid path when the cold mode variator trim valve assembly is active and the processor determines, based on signals from the pressure switches, that the cold mode variator trim valve assembly is in a fault condition.

14. The electro-hydraulic controller of claim 13, wherein the third fluid path supplies hydraulic fluid with a boosted base pressure to the normal mode variator trim valve.

15. The electro-hydraulic controller of claim 10, wherein the variator logic valve section defines a first fluid flow path under normal operating conditions, a second fluid flow path under cold operating conditions, and a third fluid flow path if a variator trim valve assembly fails during cold operating conditions.

16. The electro-hydraulic controller of claim 15, wherein the memory device includes further instructions that, when executed by the processor, process the signals from the speed sensors to determine a torque applied to the output of the variator, and depending on the direction of the torque applied to the output of the variator, modify the operation of the variator logic valve assemblies to modify the first, second, or third fluid paths to operate the variator.

17. The electro-hydraulic controller of claim 16, wherein the variator logic section includes at least one variator logic valve assembly movable between two positions to apply a positive pressure to first and second sides of the variator, depending on the torque applied to the output of the variator.

18. The electro-hydraulic controller of claim 17, wherein the variator logic section includes a boost valve that is operable to move between first and second positions to provide a boosted pressure to the variator trim section if one of the variator trim valve assemblies fails during cold operating conditions.

* * * * *